US010833431B2

(12) United States Patent
Rust

(10) Patent No.: US 10,833,431 B2
(45) Date of Patent: Nov. 10, 2020

(54) KEYED CABLE AND CONNECTOR SYSTEM

(71) Applicant: Rustcraft Industries LLC, Exeter, NH (US)

(72) Inventor: Jonathan Rust, Exeter, NH (US)

(73) Assignee: Rustcraft Industries LLC, Exeter, NH (US)

( * ) Notice: Subject to any disclaimer, the term of this patent is extended or adjusted under 35 U.S.C. 154(b) by 0 days.

(21) Appl. No.: 16/251,984

(22) Filed: Jan. 18, 2019

(65) Prior Publication Data

US 2019/0319376 A1    Oct. 17, 2019

Related U.S. Application Data

(63) Continuation of application No. 15/952,671, filed on Apr. 13, 2018, now Pat. No. 10,186,789.

(51) Int. Cl.

| H01B 17/00 | (2006.01) |
|---|---|
| H01B 7/08 | (2006.01) |
| H01B 7/40 | (2006.01) |
| H01R 12/77 | (2011.01) |
| H02G 15/076 | (2006.01) |
| H01R 9/03 | (2006.01) |
| H02G 15/02 | (2006.01) |
| H01R 13/58 | (2006.01) |

(Continued)

(52) U.S. Cl.
CPC .......... *H01R 9/031* (2013.01); *H01B 7/0807* (2013.01); *H01B 17/00* (2013.01); *H01R 13/5812* (2013.01); *H02G 15/02* (2013.01); *H02G 15/076* (2013.01); *H01B 7/40* (2013.01); *H01R 4/2406* (2018.01); *H01R 12/616* (2013.01); *H01R 12/774* (2013.01)

(58) Field of Classification Search
CPC ......... H01B 7/0807; H01B 7/08–17/00; H01R 9/031; H05K 1/118; H05K 1/119; H02G 15/02; H02G 15/076
USPC ........... 439/387, 427; 174/113 R, 115, 117 R
See application file for complete search history.

(56) References Cited

U.S. PATENT DOCUMENTS

| 3,221,096 A | 11/1965 | Croghan |
|---|---|---|
| 3,355,699 A | 11/1967 | Oshva |
| 3,720,778 A | 3/1973 | Woertz et al. |

(Continued)

FOREIGN PATENT DOCUMENTS

| WO | 8606882 A1 | 11/1986 |
|---|---|---|
| WO | 9743802 A1 | 11/1997 |

(Continued)

OTHER PUBLICATIONS

AMP, Low Profile Active Coaxial Tap Part No. 228752-1—Specification p. 1-14, Date of Download Jun. 2018—No Publication Date Available.

*Primary Examiner* — Vanessa Girardi
(74) *Attorney, Agent, or Firm* — Jodi-Ann McLane

(57) ABSTRACT

A universal cable system includes a cable, which may include a keyed profile and an optional, integrated pull cable for low-voltage applications in residential and commercial structures, both old and new construction, which may further includes a connector, which does not require individual splicing of the wires from the cable. The connector may be self-crimping or crimped with a tool. During installation of the connector onto the cable, conductors in the connector may be simultaneously spliced to the wires of the cable during crimping.

21 Claims, 25 Drawing Sheets

(51) Int. Cl.
*H01R 4/2406* (2018.01)
*H01R 12/61* (2011.01)

(56) References Cited

U.S. PATENT DOCUMENTS

| | | | |
|---|---|---|---|
| 3,840,840 A | 10/1974 | Worth | |
| 3,860,316 A | 1/1975 | Hardesty | |
| 3,920,301 A | 11/1975 | Roberts et al. | |
| 3,924,917 A | 12/1975 | Munshower | |
| 4,005,518 A | 2/1977 | Bakermans | |
| 4,018,499 A | 4/1977 | Rickards | |
| 4,038,489 A | 7/1977 | Stenson et al. | |
| 4,130,934 A | 12/1978 | Asick et al. | |
| 4,153,325 A | 5/1979 | Asick | |
| 4,194,803 A | 3/1980 | Hatch | |
| 4,217,022 A | 8/1980 | Carre | |
| 4,253,722 A | 3/1981 | Fox, Jr. | |
| 4,311,356 A | 1/1982 | Levitt | |
| 4,367,004 A | 1/1983 | Fujiura et al. | |
| 4,481,710 A | 11/1984 | Caveney et al. | |
| 4,508,410 A | 4/1985 | Canham | |
| 4,560,224 A | 12/1985 | Weisenburger | |
| 4,560,226 A | 12/1985 | Dennis | |
| 4,561,714 A | 12/1985 | Byczek et al. | |
| 4,610,493 A | 9/1986 | Masek | |
| 4,676,576 A | 6/1987 | Feldberg et al. | |
| 4,701,139 A | 10/1987 | Good et al. | |
| 4,869,684 A | 9/1989 | Cloud et al. | |
| 4,891,020 A | 1/1990 | Dunn | |
| 4,897,041 A | 1/1990 | Heiney et al. | |
| 4,902,243 A | 2/1990 | Davis | |
| 4,915,646 A | 4/1990 | Bock et al. | |
| 4,932,895 A | 6/1990 | Kerkhof | |
| 4,995,827 A | 2/1991 | Rudoy | |
| 5,009,612 A | 4/1991 | Rishworth et al. | |
| 5,011,430 A | 4/1991 | Haitmanek | |
| 5,069,625 A | 12/1991 | Brandt | |
| 5,122,078 A | 6/1992 | Davis et al. | |
| 5,269,700 A | 12/1993 | Mitra | |
| 5,338,221 A | 8/1994 | Bowen et al. | |
| 5,358,424 A | 10/1994 | Bowen et al. | |
| 5,409,396 A | 4/1995 | Bowen et al. | |
| 5,519,173 A | 5/1996 | Newmoyer et al. | |
| 5,971,793 A | 10/1999 | Jochen et al. | |
| 5,971,794 A | 10/1999 | Holzle | |
| 6,012,943 A | 1/2000 | Wu | |
| 6,027,367 A | 2/2000 | Woertz et al. | |
| 6,068,504 A | 5/2000 | Gardner et al. | |
| 6,108,904 A | 8/2000 | Brekosky et al. | |
| 6,196,863 B1 * | 3/2001 | Schwant | H01R 12/67 439/417 |
| 6,238,231 B1 | 5/2001 | Chapman et al. | |
| 6,336,830 B1 | 1/2002 | Lee | |
| 6,386,901 B1 | 5/2002 | Caldwell | |
| 6,645,002 B1 | 11/2003 | Lee | |
| 7,053,310 B2 | 5/2006 | Clark | |
| 7,135,641 B2 | 11/2006 | Clark | |
| 7,432,447 B2 | 10/2008 | Glew | |
| 9,450,314 B2 | 9/2016 | Braun et al. | |
| 2008/0076295 A1 | 3/2008 | Lappoehn | |
| 2008/0153346 A1 | 6/2008 | Oesterhaus et al. | |
| 2010/0321591 A1 | 12/2010 | Onomatsu | |
| 2012/0309224 A1 | 12/2012 | Kajiura et al. | |
| 2013/0049731 A1 | 2/2013 | Mathis et al. | |
| 2014/0235094 A1 | 8/2014 | Braun et al. | |
| 2015/0107874 A1 | 4/2015 | Green et al. | |
| 2017/0340101 A1 | 11/2017 | Koch | |

FOREIGN PATENT DOCUMENTS

| | | |
|---|---|---|
| WO | 0001037 A1 | 1/2000 |
| WO | 20030064615 | 4/2003 |
| WO | 03103097 A1 | 12/2003 |
| WO | 20040074665 | 4/2004 |
| WO | 20040154826 | 8/2004 |
| WO | 20040157485 | 8/2004 |
| WO | 20060199421 | 9/2006 |
| WO | 20070264866 | 11/2007 |

* cited by examiner

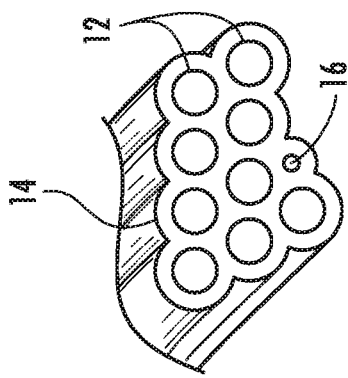
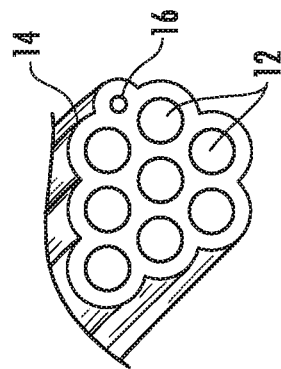
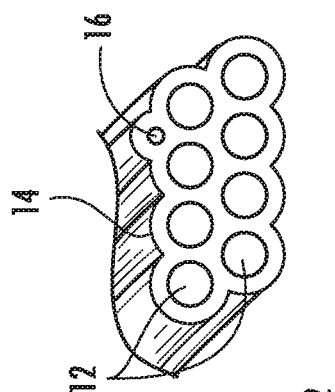
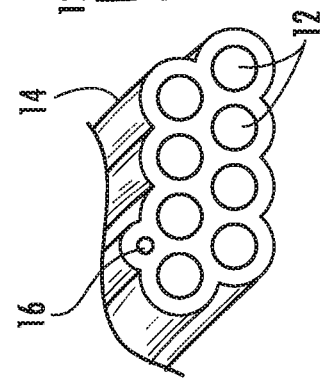
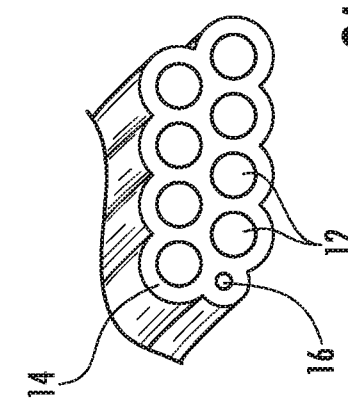
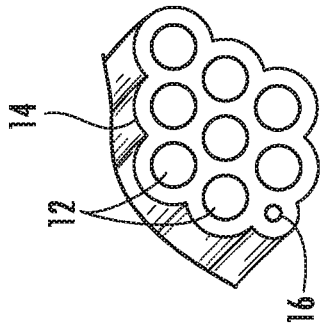
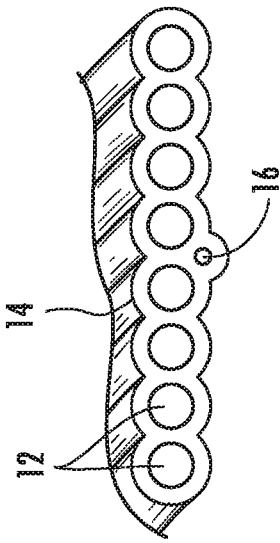

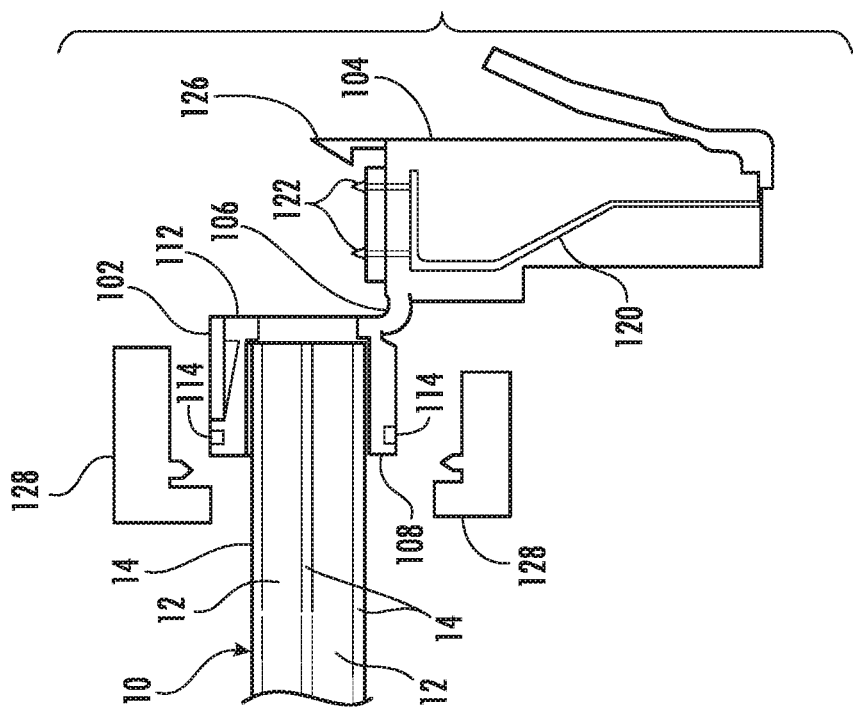
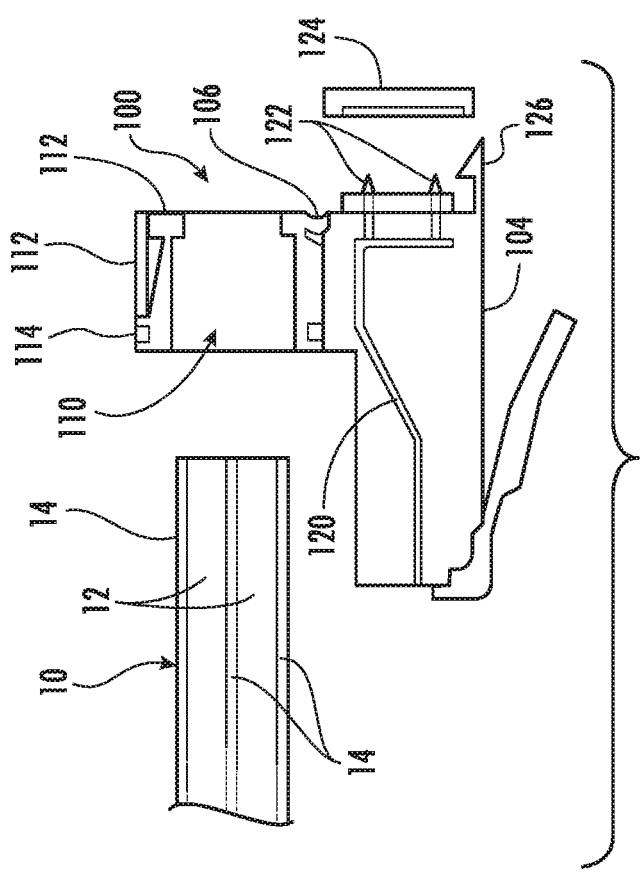
FIG. 4A
FIG. 4B

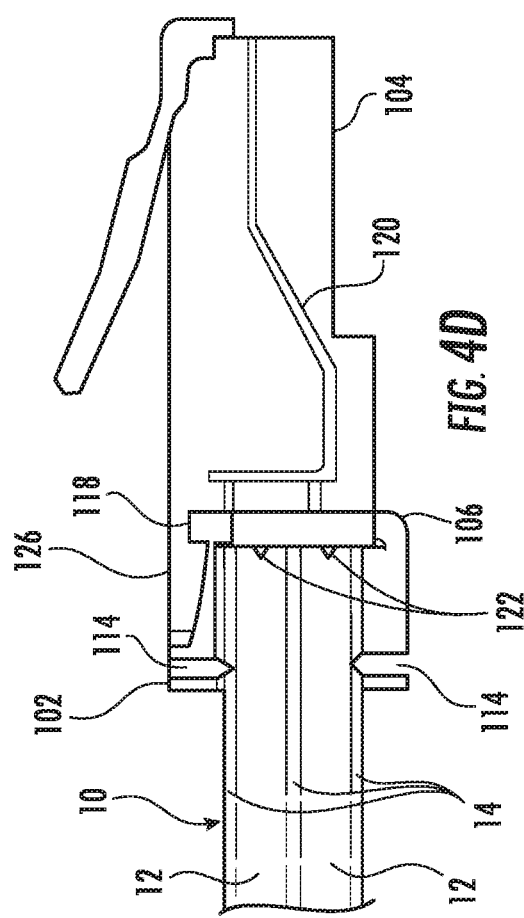
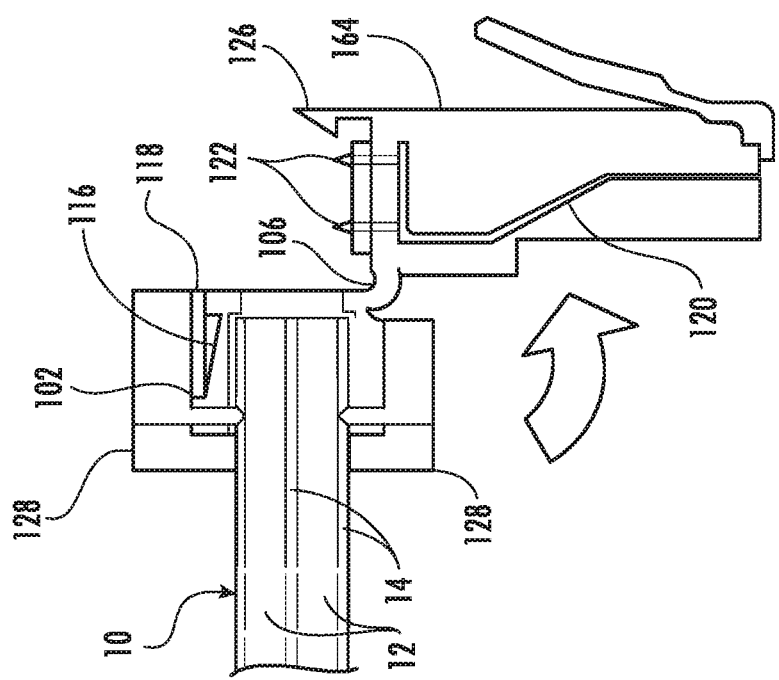

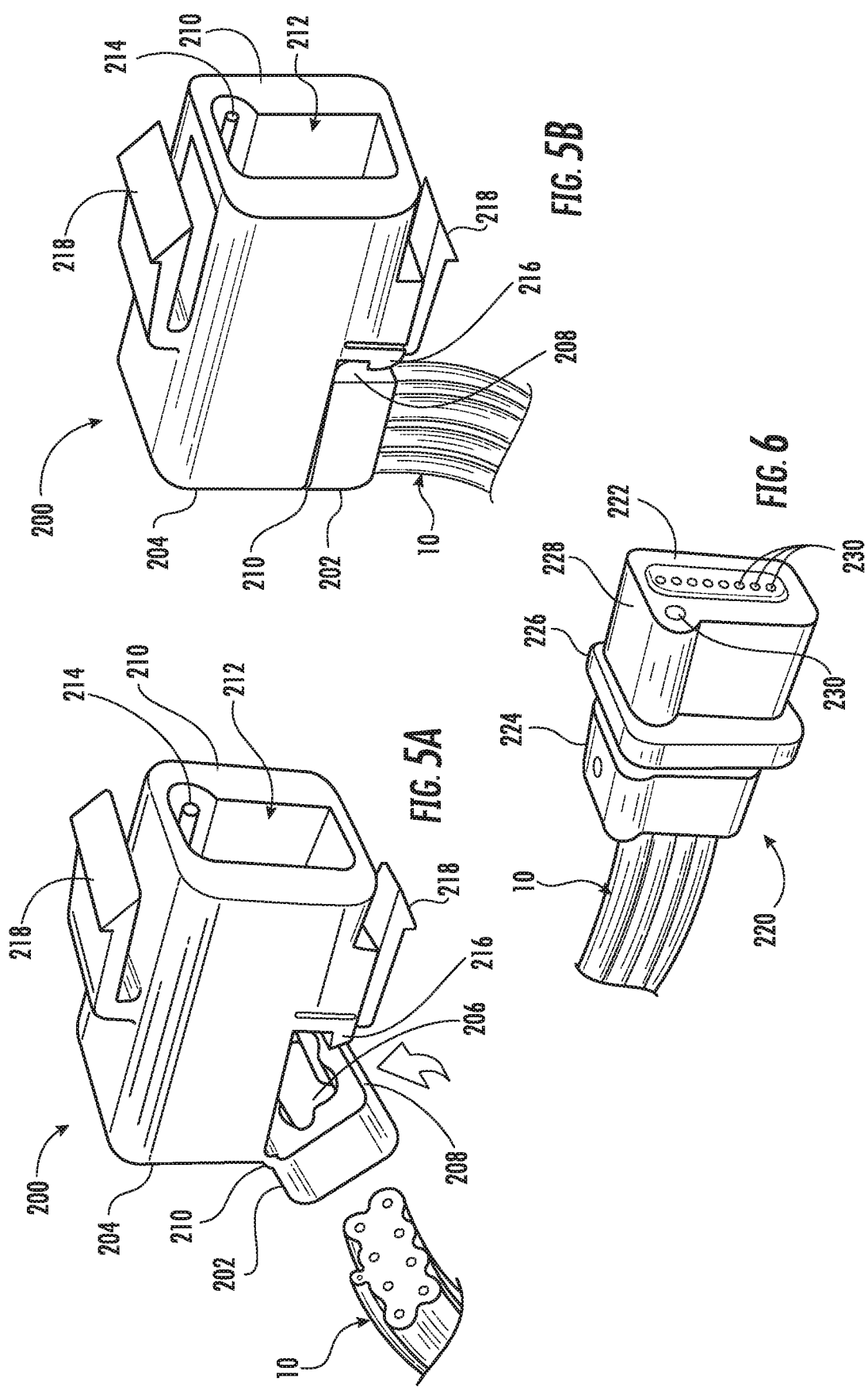

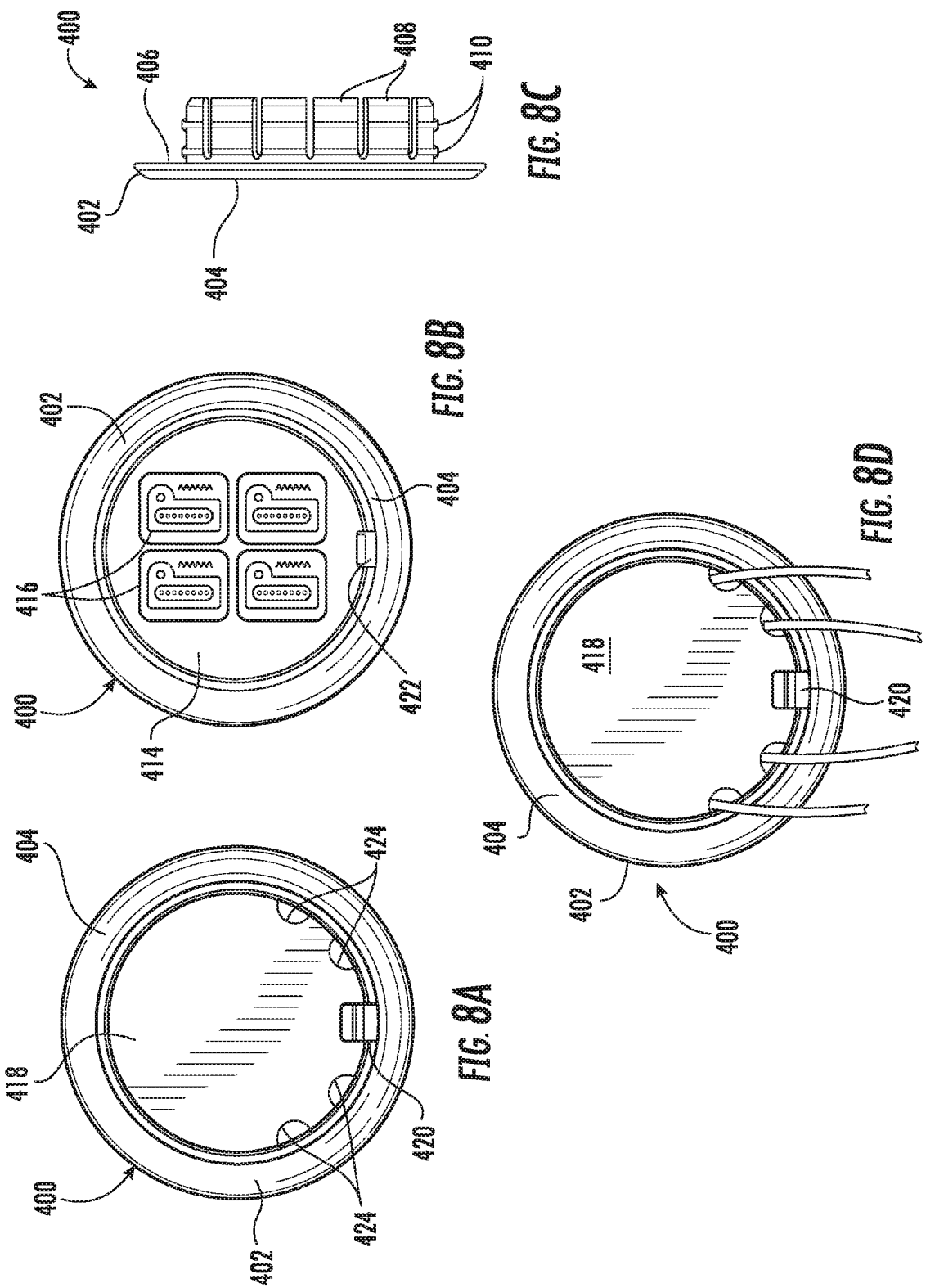

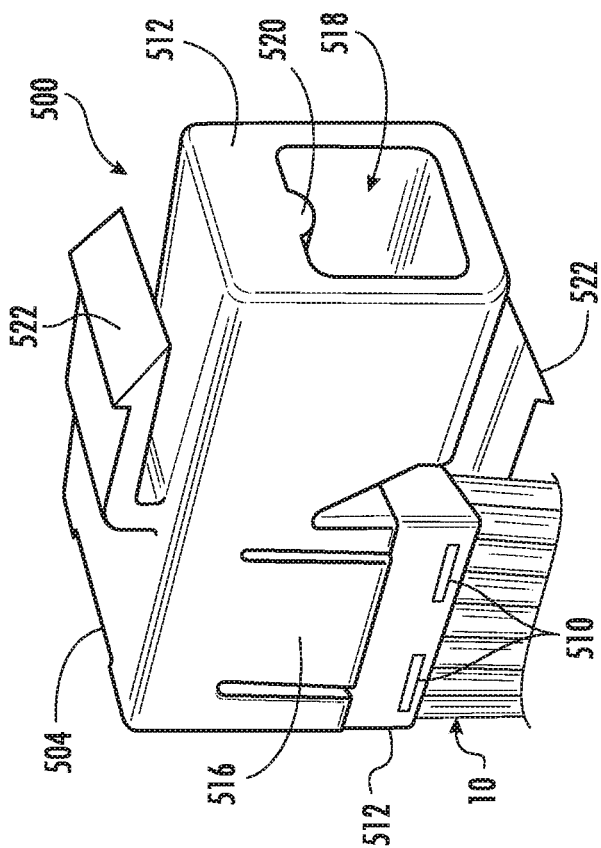
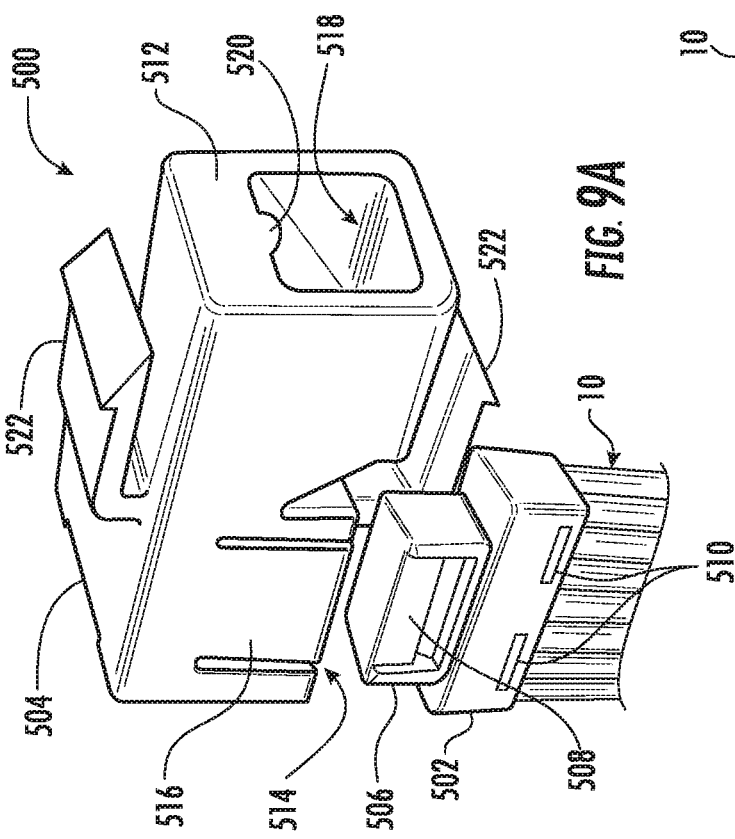
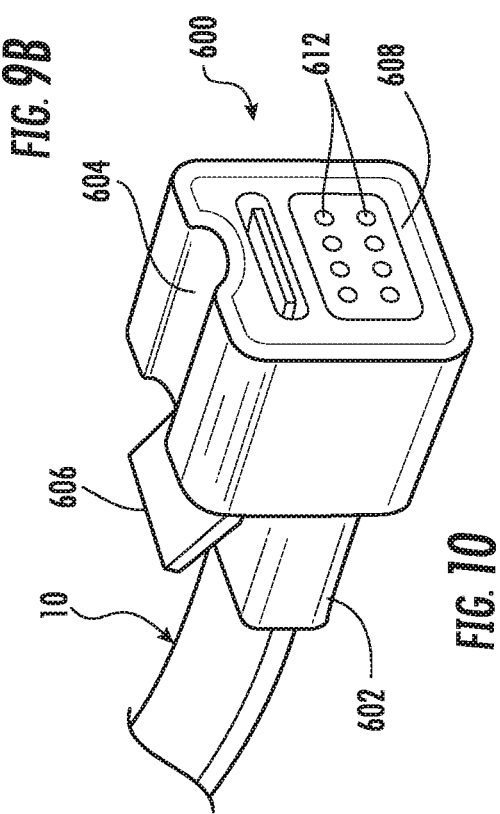

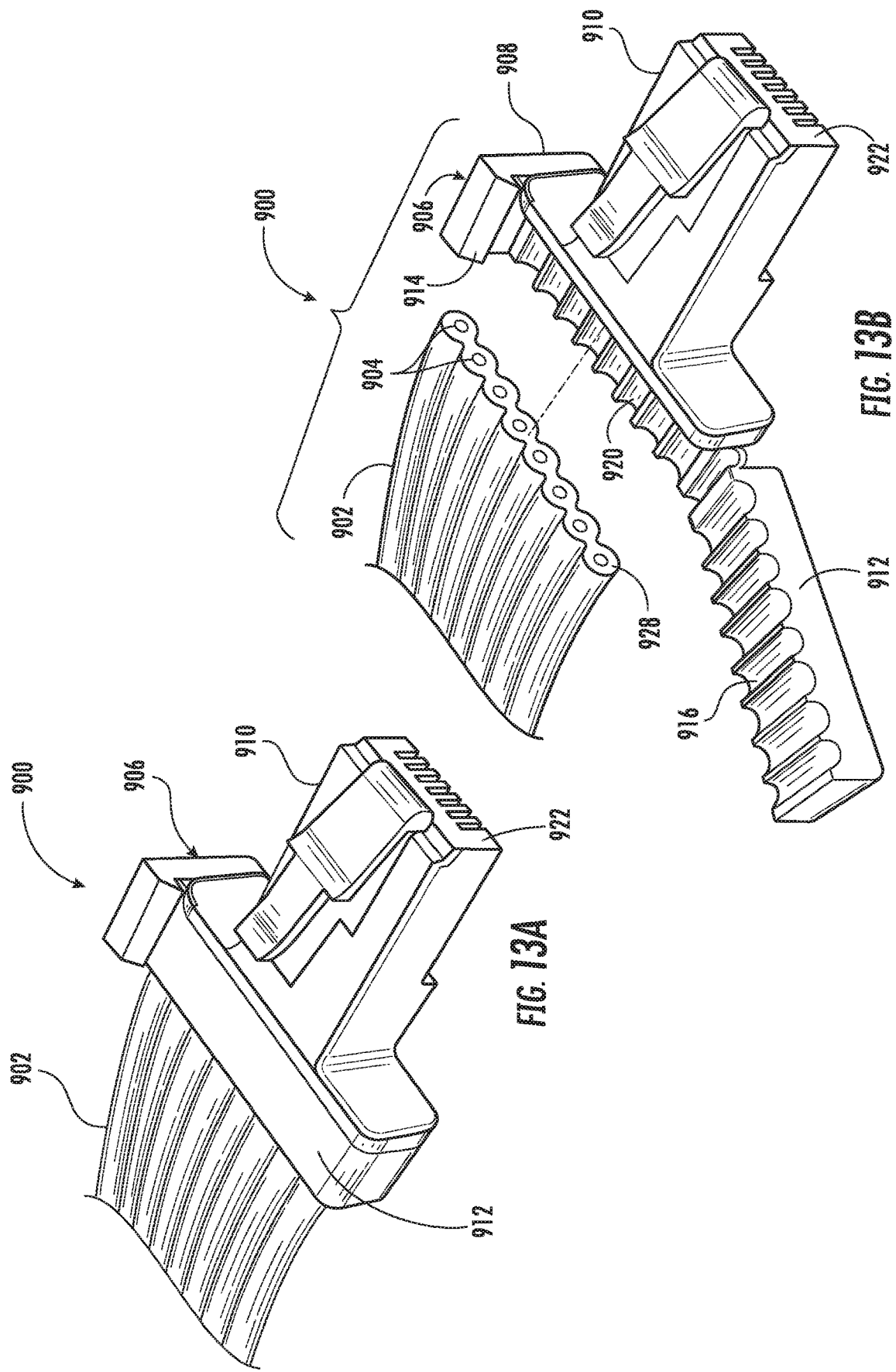

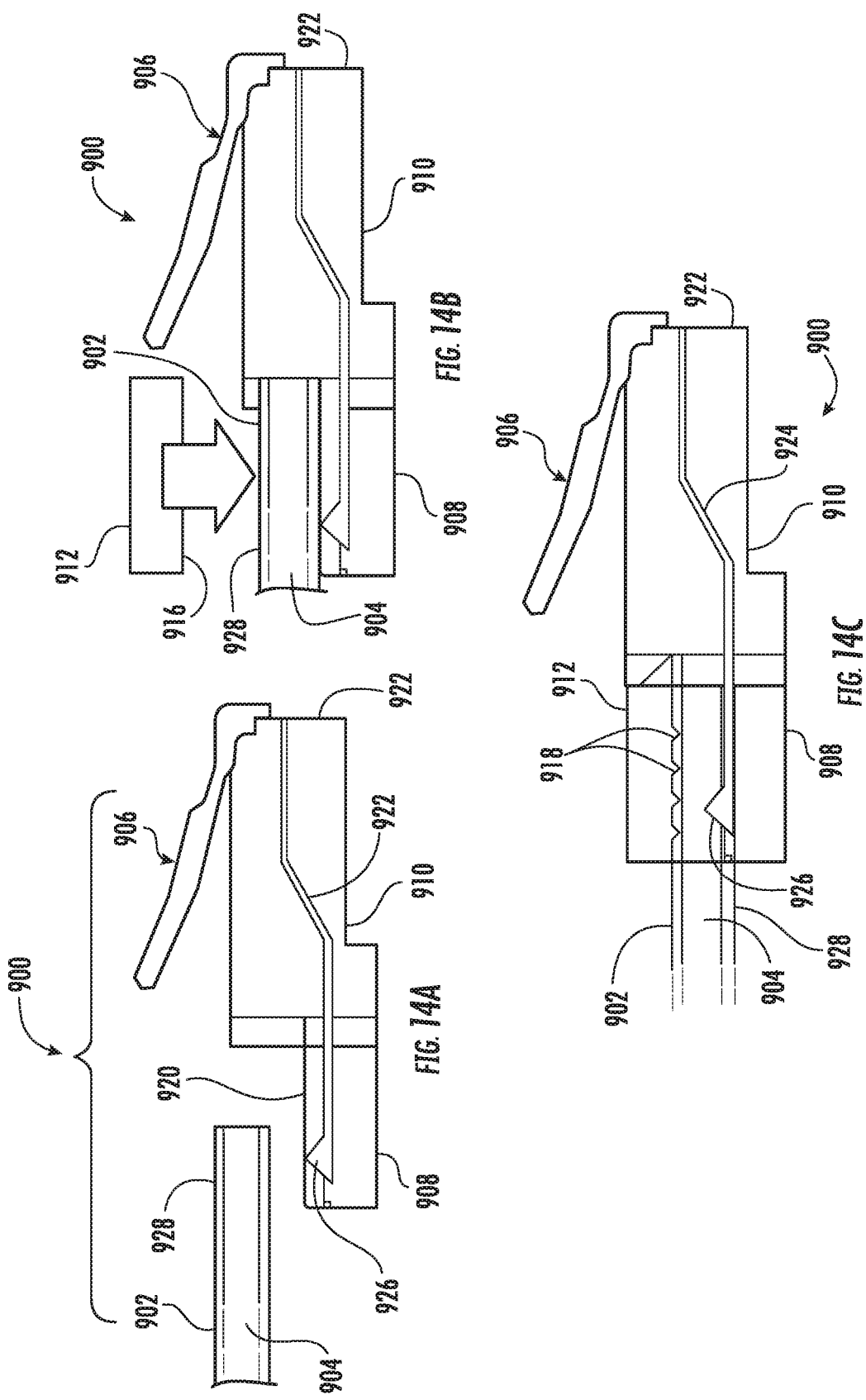

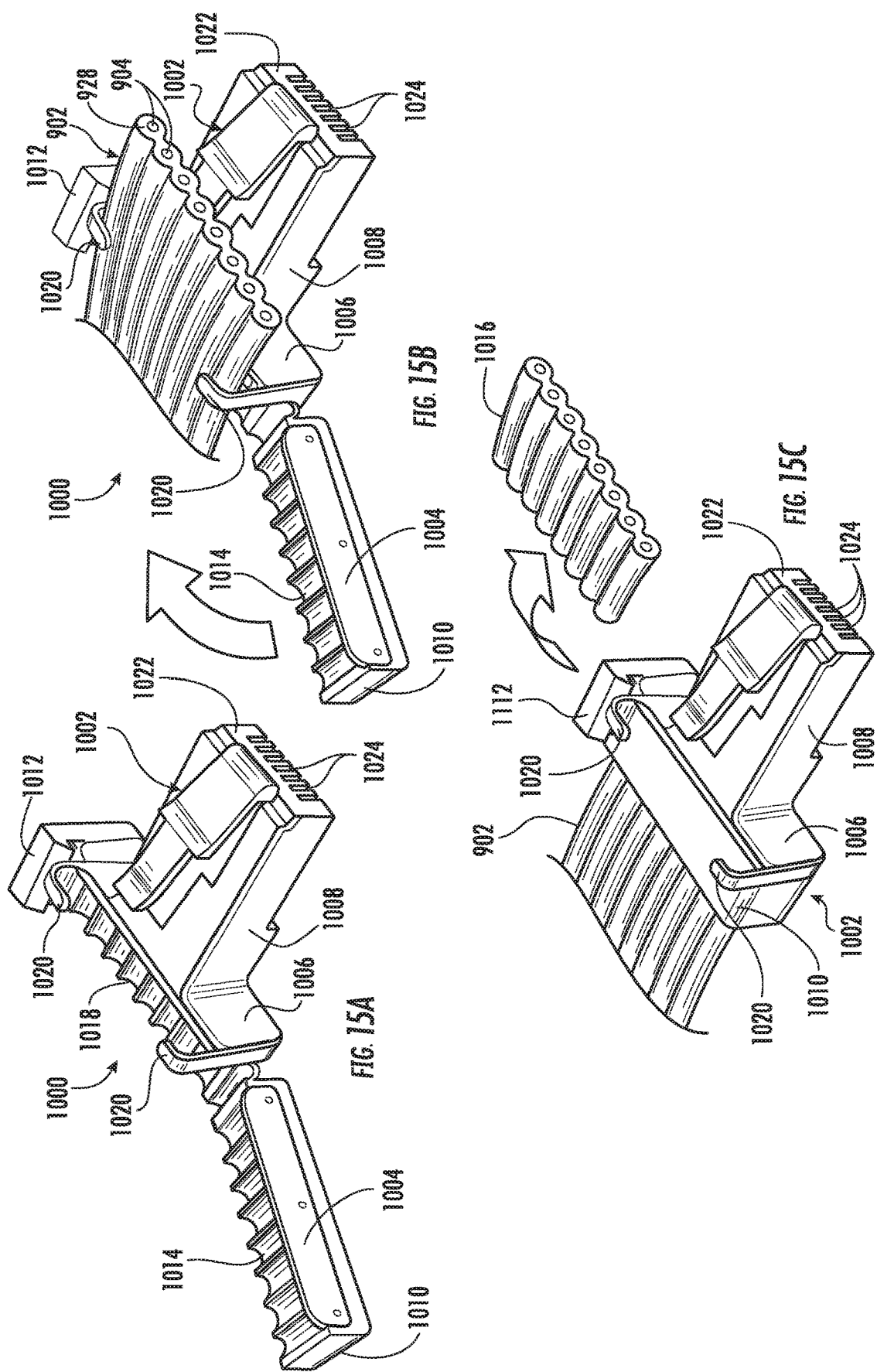

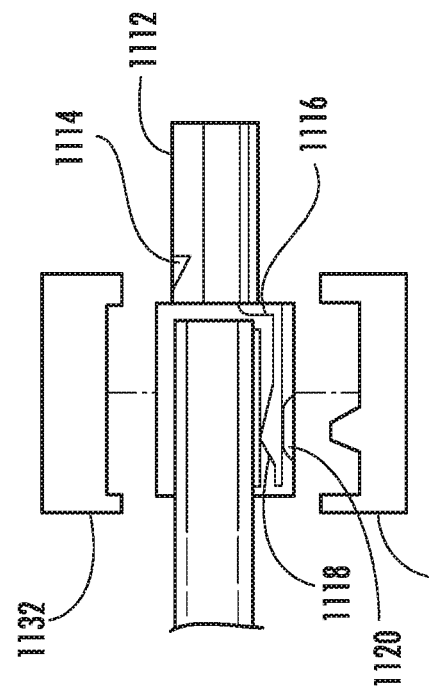
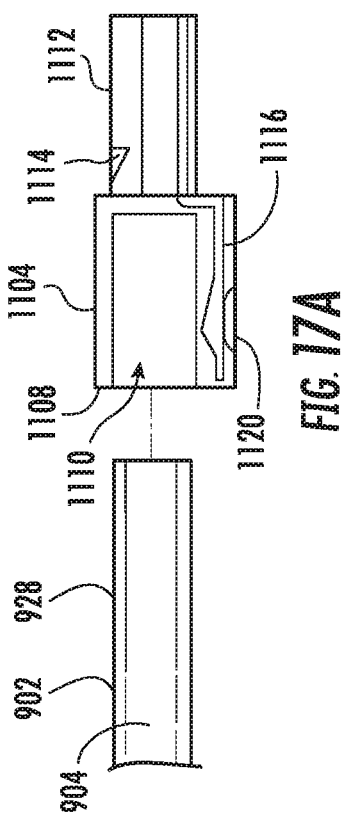
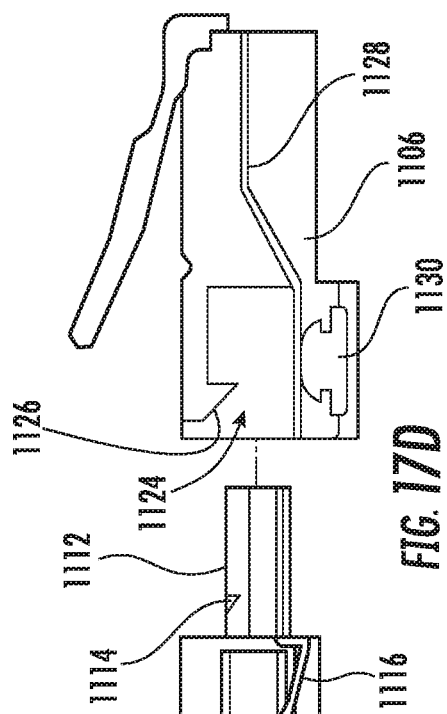
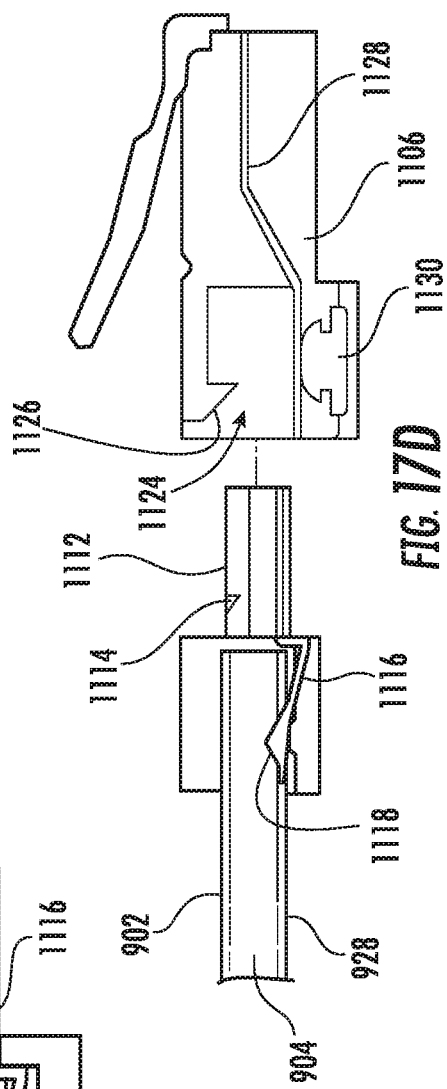

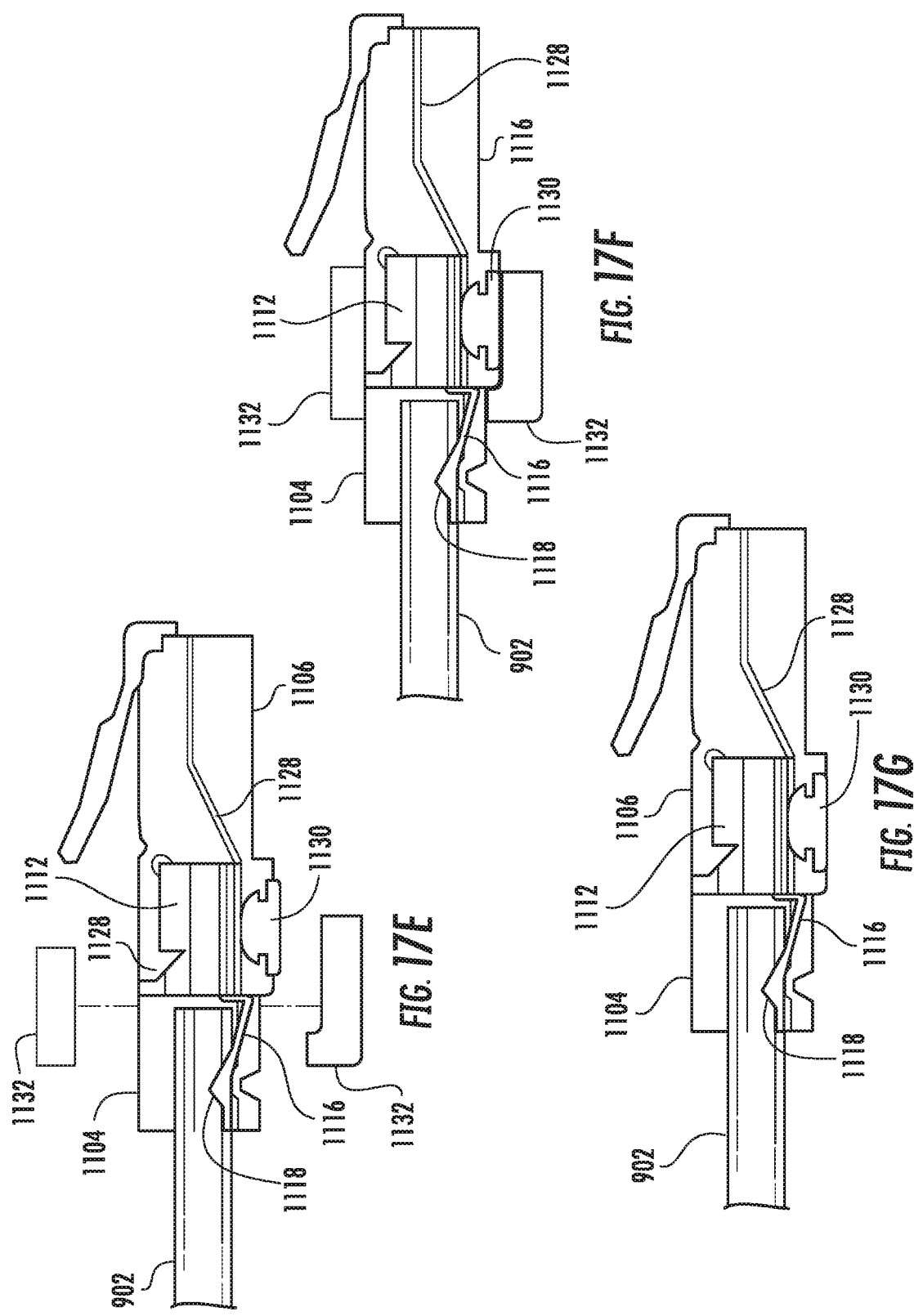

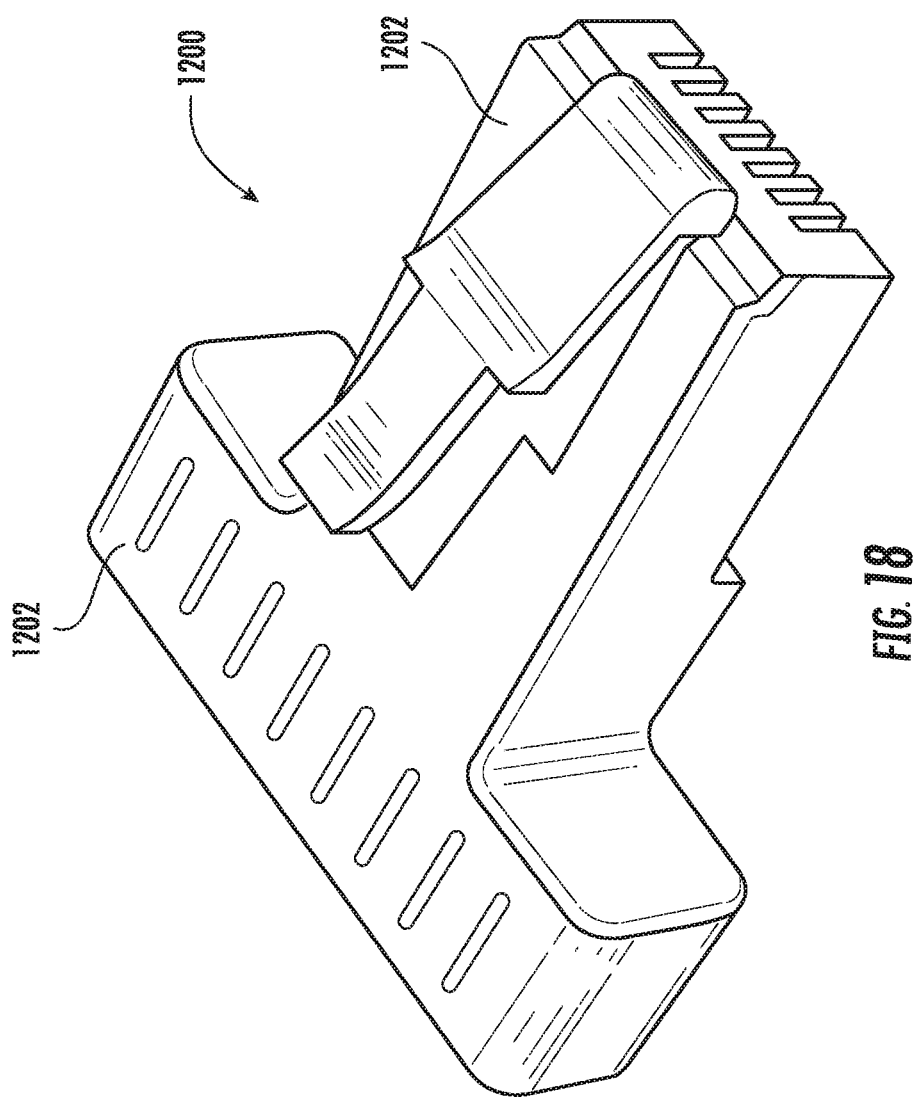

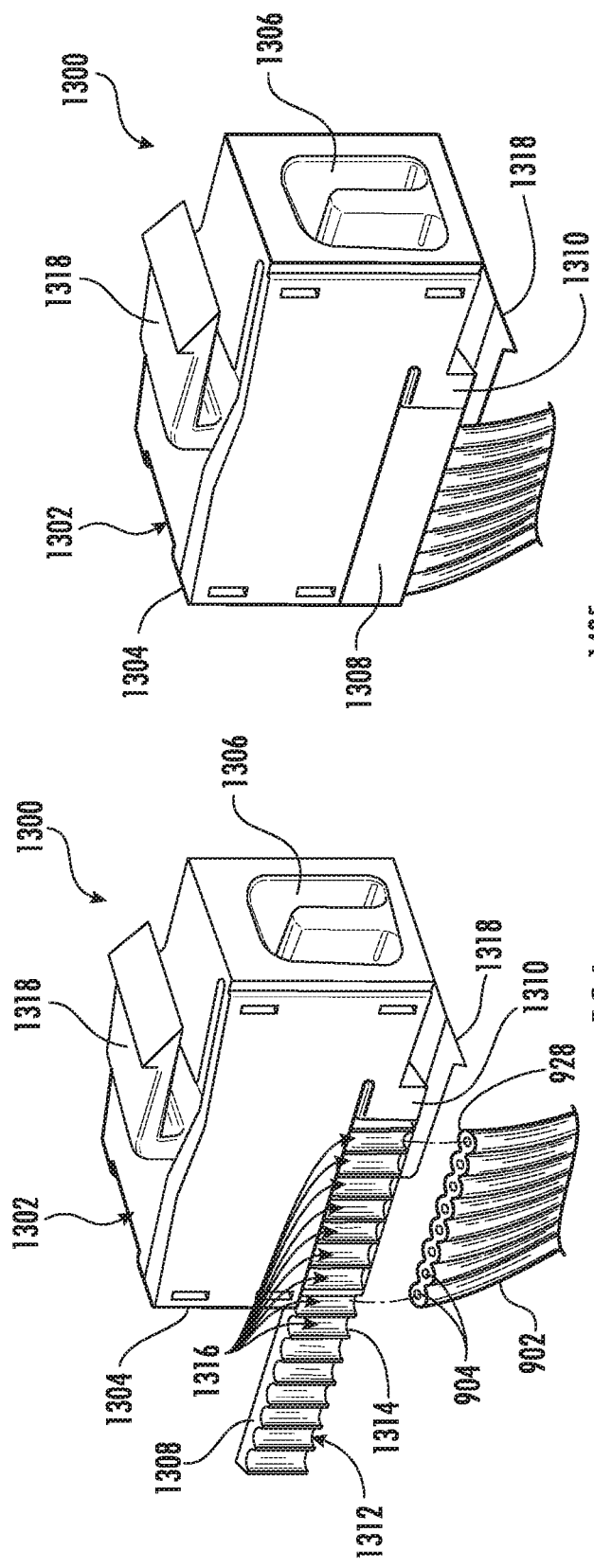
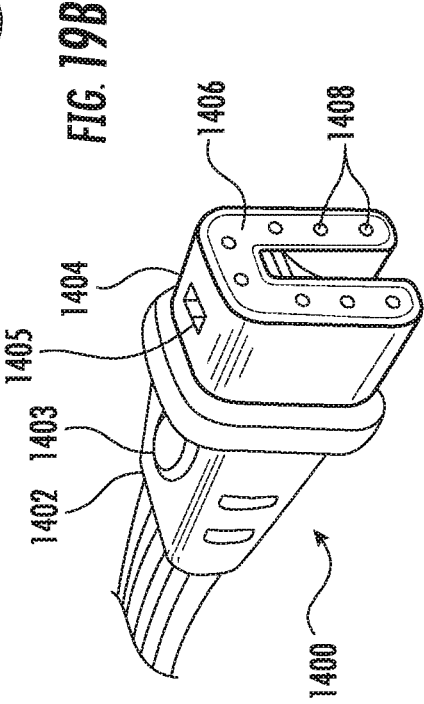
FIG. 19A
FIG. 19B
FIG. 20

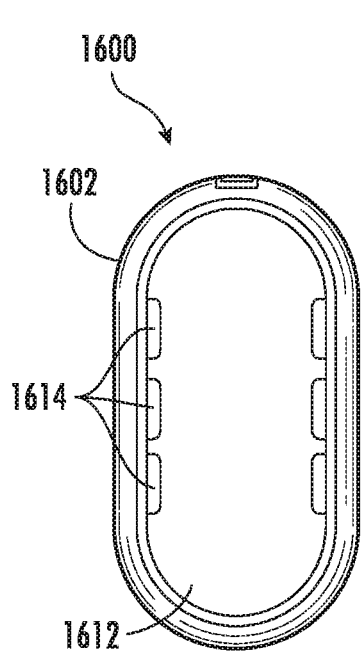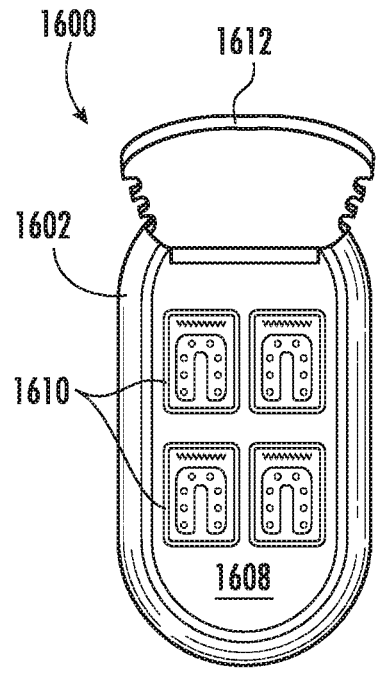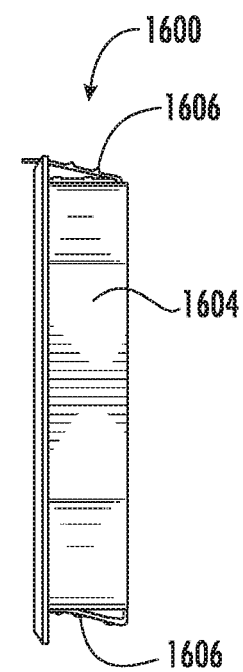
FIG. 22A   FIG. 22B   FIG. 22C
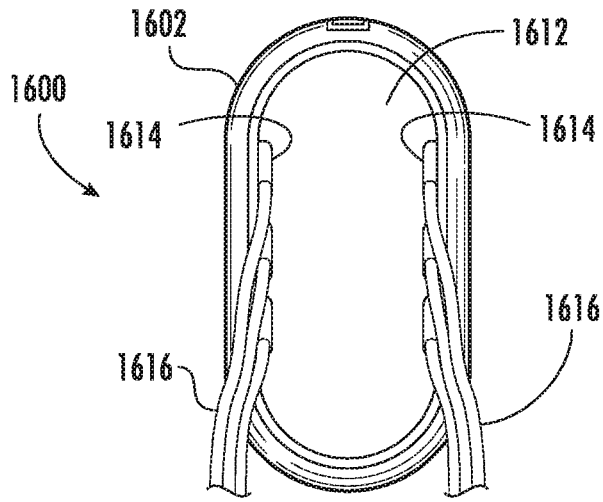
FIG. 22D

KEYED CABLE AND CONNECTOR SYSTEM

CROSS-REFERENCE TO RELATED APPLICATION

This patent document is a continuation of earlier filed U.S. patent application Ser. No. 15/952,671, filed on Apr. 13, 2018.

TECHNICAL FIELD

The present patent documents relates generally to wiring and cables, and more particularly to a universal cable system for low voltage power, communications and control applications in structures, such as telephone, internet, television and lighting in commercial and residential property.

BACKGROUND

Traditional wiring in residential and commercial structures typically includes high-voltage wiring. High-voltage wiring, though, requires more expensive training and licensing to install, repair or modify. Low-voltage wiring, which requires less training and licensing, may be used for lighting, such as LED fixtures, and communications, such as telephone, internet and cable. However, low-voltage wiring includes different cables for different uses, such as CAT-5 and Cat-6+ for internet, Voice Over IP telephone, Power over Ethernet application ("POE"), to name just a few. Furthermore, each cable type generally includes different connectors, both male and female, requiring the user to own the appropriate tools and know how to attach, crimp and/or splice each connector to each cable type. Consequently, during installation or modification of an existing structure, multiple pulls are required of different cable types and multiple tools to install different connector types for each type of cable, which increases the cost of installing low-voltage wiring. Pulling cables through conduits and cable chases in new and preexisting structures, notably, is both difficult, laborious, and time consuming. If users are not careful while pulling the cable damage may occur to the jacket or wires of the cable, requiring that the cable be re-pulled to intermittent and hard to diagnose electrical problems. Even for POE applications, which aims to reduce the number of wires and connector types suffers from increased costs and malfunctions because attaching connectors to the cable requires training and skill to properly splice the connector to the cable. A bad custom crimp renders a cable useless.

SUMMARY

Therefore, there is a perceived need in the industry for a cable system that reduces time and difficulty of installing or modifying high-voltage and low-voltage wiring. In particular, there is a need for a wiring system that requires less pulls of different types of cables in conduits and cable chases of new and existing structures. Furthermore, there is a perceived need in the industry for a cable system that requires fewer tools and connectors to attach to cables, which also reduces installation time and training of technicians and makes high-voltage and low-voltage wiring and POE applications more accessible to the do-it-yourself home owner.

The universal cable system described herein solves the problems of the prior art by providing a cable that may have a unique, keyed profile, that may also include an integrated pull cable. The keyed profile of the cable may only insert in one orientation into a connector, preventing incorrect wiring with the connector. In some embodiments, the universal cable system requires only a single tool to cut and crimp connectors to the cable. In other embodiments, the connector may be self-crimping. In some embodiments the connector may include a separate base portion and selectable connector portion, allowing the correct type of plug or jack end be selected for the intended use. In some embodiments, complementary patch panels and wall plates may be included, increasing the versatility of the system. The cable further includes multiple wires suitable for many wiring applications, such as LED lighting, internet, telephone, television, speakers, computers, wireless access points, security cameras, monitors, door access controls, motion sensors, and a whole host of IOT (Internet of Things) devices, which enables a one-wire solution to be used throughout a structure suitable for electrical wiring applications, and eliminating the need for multiple wires and connector types, or even traditional electrical lines and outlets.

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments, and are incorporated in and constitute a part of this specification, but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

FIG. 2A is an end view of an exemplary second embodiment of a stacked cable;

FIG. 2B is an end view of an exemplary third embodiment of a stacked cable;

FIG. 2C is an end view of an exemplary fourth embodiment of a stacked cable;

FIG. 2D is an end view of an exemplary fifth embodiment of a stacked cable;

FIG. 2E is an end view of an exemplary sixth embodiment of a stacked cable;

FIG. 2F is an end view of an exemplary seventh embodiment of a stacked cable;

FIG. 2G is an end view of an exemplary eighth embodiment of a stacked cable;

FIG. 4A is a partial cross-section view through line 4A-4A of FIG. 3A;

FIG. 4B is a partial cross-section view, illustrating a stacked cable being inserted into the keyed opening of an embodiment of a connector and being readied for crimping;

FIG. 4C is a partial cross-section view, illustrating a base of the connector crimped to the stacked cable and FIG. 4D is a partial cross-section view, illustrating engaging a first portion of the connector to the base of the connector and forming an electrical contact with the stacked cable;

FIG. 5A is a front perspective view of an exemplary second embodiment of a connector, showing a stacked cable positioned for insertion into a keyed opening of a base portion thereof;

FIG. 5B is a front perspective view of an exemplary second embodiment of a connector, showing the stacked cable fully seated in the base portion and locked in position against the first portion thereof;

FIG. 6 a front perspective view of an embodiment of a male connector configured to engage the second embodiment connector illustrated in FIGS. 5A-5B;

FIG. 8A is a front view of another embodiment of a wall plate with a removable cover attached thereto;

FIG. 8B is a front view of another embodiment of a wall plate with a removable cover removed from the panel;

FIG. 8C is a side view thereof;

FIG. 8D is a front view thereof with the cover attached and four wires connected to the wall plate;

FIG. 9A is a partial front exploded view of an exemplary third embodiment of a connector, showing a stacked cable with attached base portion thereon, in position for coupling and a connector portion thereof;

FIG. 9B is a front perspective view of an exemplary third embodiment of a connector, showing the stacked cable and base portion locked in position against the connector portion thereof;

FIG. 10 a front perspective view of an embodiment of a male connector configured to engage the third embodiment connector illustrated in FIGS. 9A-9B;

FIG. 13A is a front perspective view of another exemplary embodiment of a universal cable system made in accordance herewith;

FIG. 13B is a partial exploded view of the universal cable system illustrated in FIG. 12A;

FIG. 14A is a partial side cross-section view showing a first step in attaching the connector illustrated in FIG. 13A to a cable;

FIG. 14B is a partial side cross-section view showing a second step in attaching the connector illustrated in FIG. 13A to a cable;

FIG. 14C is a partial side cross-section through line 14C-14C of FIG. 13A;

FIG. 15A is a front perspective view of an alternative embodiment of a connector, showing a crimp retainer with integrated trimming blade;

FIG. 15B is a front perspective view illustrating a step of measuring a cable for trimming in the alternative embodiment of the connector shown in FIG. 15A;

FIG. 15C is a front perspective view illustrating a step of trimming and crimping a cable into the alternative embodiment of the connector shown in FIG. 15A;

FIG. 17A is a partial side cross-section view, illustrating a first step in aligning a cable with a keyed opening in a base portion of an embodiment of a connector illustrated in FIGS. 16A-16C;

FIG. 17B is a partial side cross-section view, illustrating a second step in aligning a crimping tool over the cable and base portion of an embodiment of a connector illustrated in FIGS. 16A-16C;

FIG. 17C is a partial side cross-section view, illustrating a third step in crimping a cable to the base portion of an embodiment of a connector illustrated in FIGS. 16A-16C;

FIG. 17D is a partial side cross-section view, illustrating a fourth step in aligning a base portion to the connection portion of an embodiment of a connector illustrated in FIGS. 16A-16C;

FIG. 17E is a partial side cross-section view, illustrating a fifth step in aligning a crimping tool over the assembled base portion and connection portion of an embodiment of a connector illustrated in FIGS. 16A-16C;

FIG. 17F is a partial side cross-section view, illustrating a sixth step in crimping the base portion to the connection portion of an embodiment of a connector illustrated in FIGS. 16A-16C;

FIG. 17G is a partial side cross-section view, showing the assembled and crimped cable, base portion and connection portion of an embodiment of a connector illustrated in FIGS. 16A-16C;

FIG. 18 is a front perspective view of yet another alternative embodiment of a connector made in accordance with the universal cable system described herein, showing a single piece connector;

FIG. 19A is a partial front exploded view of an exemplary embodiment of a universal cable system, showing a cable adjacent to a connector thereto;

FIG. 19B is a front perspective view of an exemplary embodiment of a universal cable system, showing a cable crimped in an embodiment of a connector thereof;

FIG. 20 is a front perspective view of an embodiment of a male connector configured to engage the embodiment of the connector illustrated in FIGS. 19A-19B;

FIG. 21A is a top, right, front perspective view of an embodiment of a panel having a plurality of connectors illustrated in FIGS. 19A-19B;

FIG. 22A is a front view of another embodiment of a wall plate with a hinged cover in a closed position;

FIG. 22B is a front view of another embodiment of a wall plate with a hinged cover in an open position;

FIG. 22C is a side view thereof; and

FIG. 22D is a front view thereof with the cover in a closed position and four wires connected to the wall plate.

DETAILED DESCRIPTION OF THE ILLUSTRATIVE EMBODIMENTS

The examples of the apparatus discussed herein are not limited in application to the details of construction and the arrangement of components set forth in the following description or illustrated in the accompanying drawings. It will be understood to one of skill in the art that the apparatus is capable of implementation in other embodiments and of being practiced or carried out in various ways. Examples of specific embodiments are provided herein for illustrative purposes only and are not intended to be limiting. Also, the phraseology and terminology used herein is for the purpose of description and should not be regarded as limiting. Any references to examples, embodiments, components, elements or acts of the apparatus herein referred to in the singular may also embrace embodiments including a plurality, and any references in plural to any embodiment, component, element or act herein may also embrace embodiments including only a singularity (or unitary structure). References in the singular or plural form are not intended to limit the presently disclosed apparatus, its components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1A:
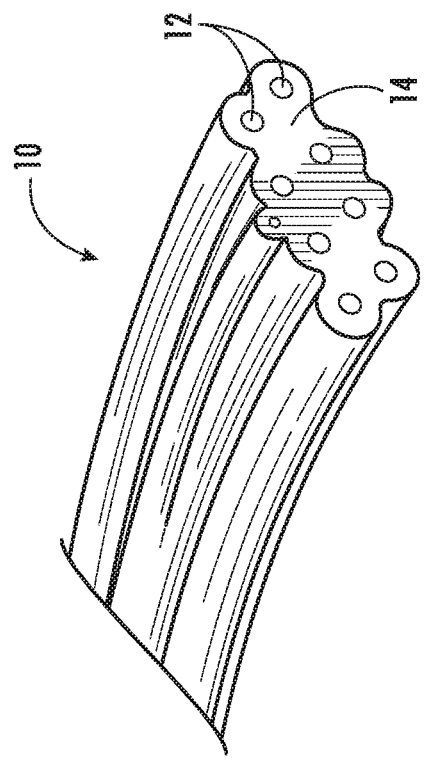
FIG. 1A is a perspective view of an exemplary embodiment of a stacked cable for use with the universal cable system escribed herein.
Figure 1B:
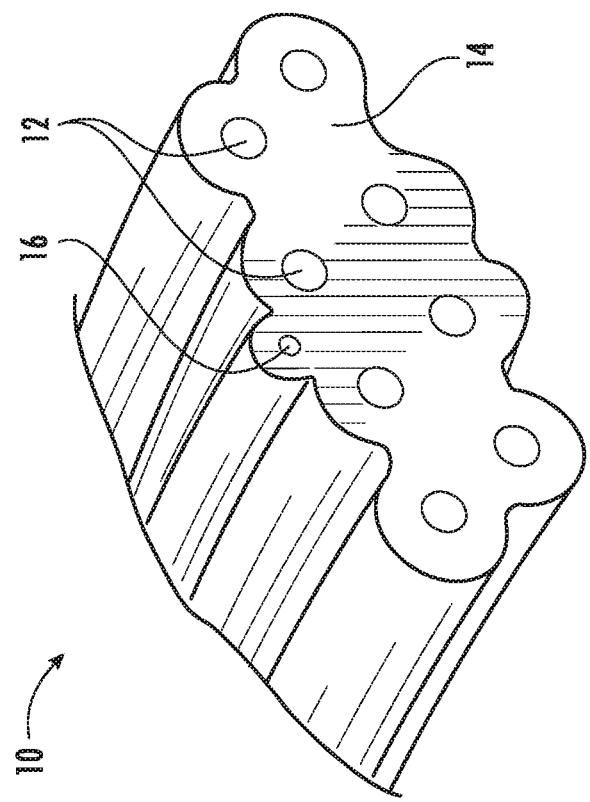
FIG. 1B is an end view of an embodiment of stacked cable illustrated in FIG. 1A.

Referring to FIGS. 1A and 1B, the universal cable system may comprise a cable 10, including a plurality of conductive wires 12 coated in an electrically insulative jacket 14. The wires 12 may be braided or solid core. The gauge of the wire may be from 1-24 gauge. Low voltage applications typically require only 18-24 gauge wire, whereas high-voltage wiring is typically 8-14 gauge wire. The jacket 14 may be formed from a thermoplastic. The wires 12 and jacket 14, together, form a keyed cross-sectional profile. The cable 10 may further include a pull cable 16 for running the cable in cable chases and conduits, without risking damage to the wires 12 and/or jacket 14. The pull cable 16 may be integrated into the jacket 14 and may further define a portion of the keyed cross-sectional profile of the cable 10. Although these exemplary embodiments are shown and described below have eight wires 12, cables 10 having fewer or additional wires 12 may be used. Eight wires 12 are generally suitable for providing data and power-over-ethernet applications for low-voltage lighting and control systems.

In one embodiment, the cable 10 includes two rows of wires 12, with the second row offset by half a wire distance, which, with the pull wire 16 and jacket 14 form the keyed cross-sectional profile. However, other variations and configurations of the "stacking" of the wires 12 may be selected. For instance, in FIG. 2A an embodiment is illustrated with the pull cable 16 located on an end of the two rows of wires 12. In FIGS. 2B and 2C, the pull cable may be offset left or right from the center of the top (or bottom) row. In each case, the keyed cross-sectional profile of the cable 10 is changed. In another embodiment shown in FIG. 2D, the arrangement of wires 12 may be formed in three rows of one, three and four wires 12, respectively, with the pull cable 16 adjacent to the row containing one wire 12. In FIG. 2E, an embodiment is shown where the wires 12 are arranged in the single row with the pull cable 16 near the center. In this embodiment the protrusion of the pull cable 16 and jacket 14 from the single row of wires 12 defines the keyed cross-sectional profile. In another embodiment shown in FIG. 2F, the arrangement of wires 12 may be formed in three rows of two, three and three wires 12, respectively, with the pull cable 16 adjacent to the row containing two wires 12. In another embodiment shown in FIG. 2G, the arrangement of wires 12 may be formed in three rows of two, three and three wires 12, respectively, with the pull cable 16 adjacent to the top row containing three wires 12. As can be seen in FIGS. 1B and 2A through 2E, the keyed cross-sectional profile may have a symmetrical or asymmetrical shape. Regardless of the symmetry, or lack thereof, the keyed cross-sectional profile of the cable prevents the cable from being inserted upside down, or otherwise reversed, into a keyed opening of a connector.

Figure 3B:
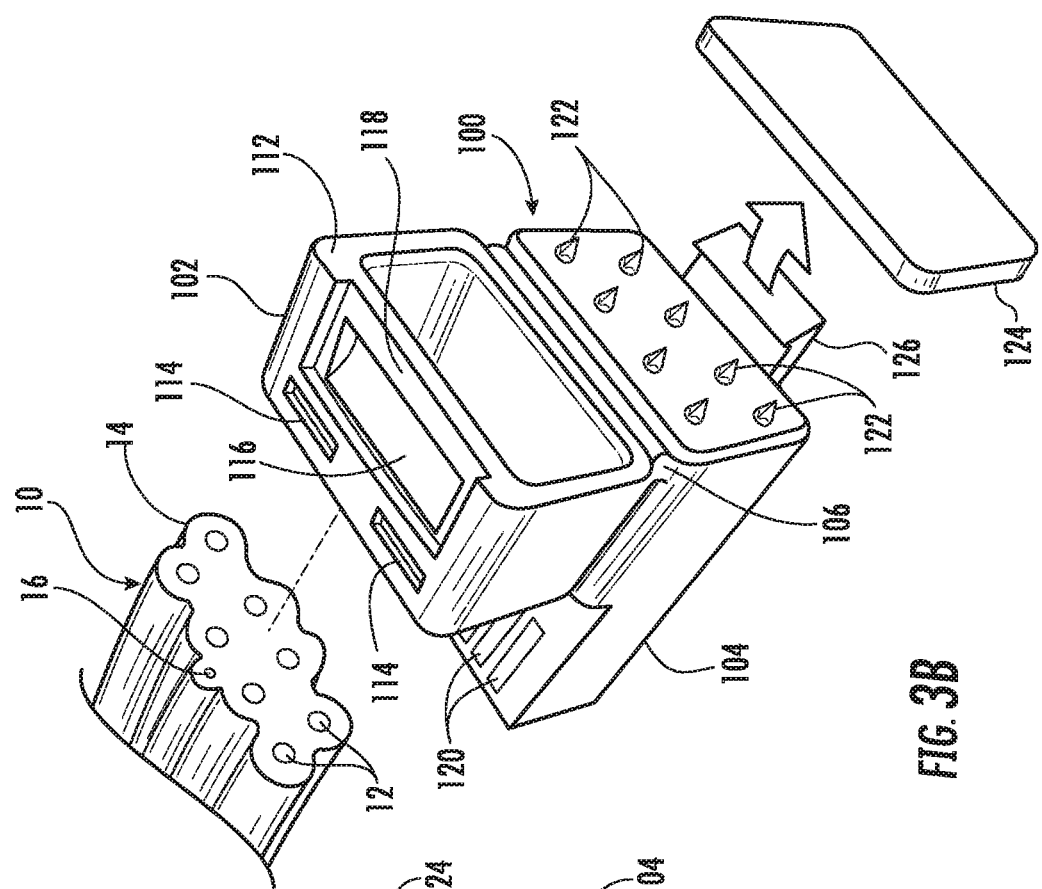
FIG. 3B is a front perspective view of the first embodiment of a connector shown in FIG. 3A.
Figure 3A:
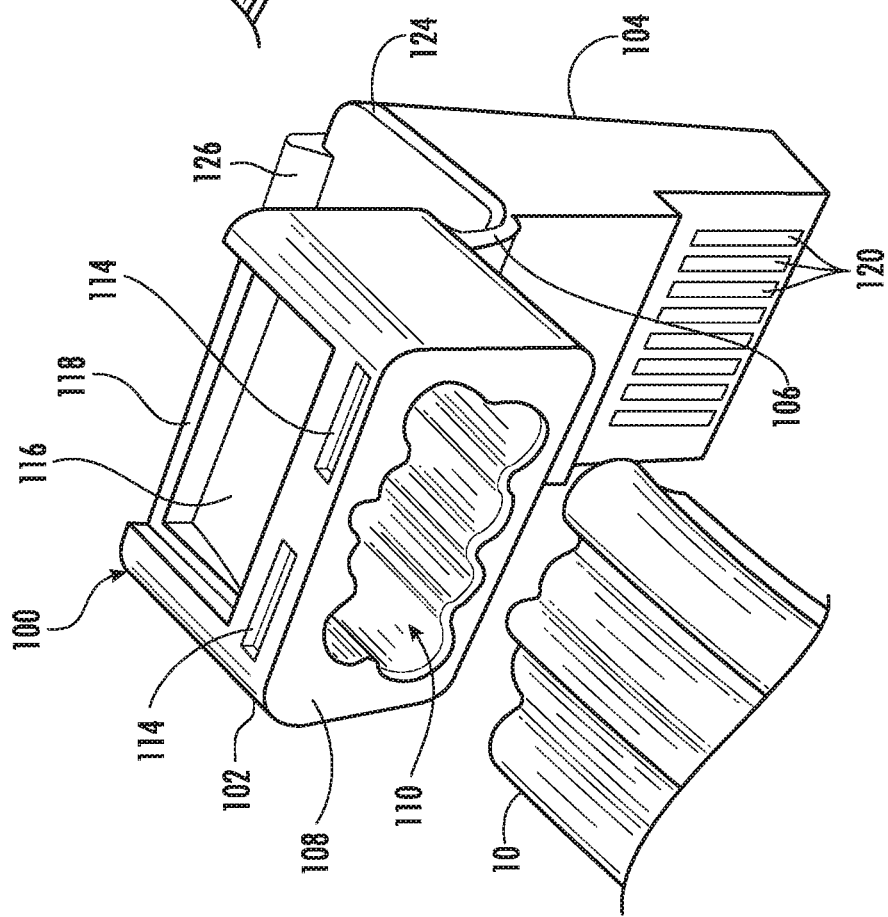
FIG. 3A is a rear perspective view of an exemplary first embodiment of a connector for use with universal cable system described herein.

Referring to FIGS. 3A and 3B, an exemplary first embodiment of a connector is shown generally at 100. The connector 100 includes a base portion 102 hinged to a connector portion 104. Alternatively, the base portion 102 could couple to the connector portion 104 via multiple retaining clips 126 interlocking with multiple lips 118. The base portion 102 includes a rear face 108 with a keyed opening 110 having a complementary profile to the cable 10. Opposite the rear face 108 is an open front face 112. With the cable 10 inserted in the keyed opening 110, the end of the cable 10 is revealed in the open front face 112. The base portion 102 may further include crimping ports 114 on a top surface and bottom surface to secure the cable 10 within the keyed opening 110 of the base portion 102 with a crimping tool. Alternatively, the crimping ports 114 may be located on side surfaces of the base portion 102. The top surface further includes a recessed area 116 from a lip 118 at the front face 112 of the base portion 102. At the bottom surface towards the front face 112, a hinge 106 is formed, such as a living hinge, which connects the connection portion 104 to the base portion 102. The connection portion 104 includes a rear face, connection plug, top surface, bottom surface and side surfaces. The rear face has a number of conductors 120 (best seen in FIGS. 4A-4D) having prongs 122 projecting rearwardly, which are configured and arranged in a pattern to align with the wires 12 of the cable 10. The conductors 120 extend through the connection portion 104 and are exposed on the connection plug for insertion into a compatible jack. For instance, the connection plug and compatible jack may be an 8P8C style connector like an RJ45, for use in ethernet and office telephone wiring. The connector plug may be configured as other style connectors. An optional, removable safety cap 124 may be attached to the rear face of the connection portion 104 to protect the prongs 122 of the conductors 120. Extending rearward from the top surface of the connection portion 104 is a retaining clip 126 configured and arranged to couple to the lip 118 on the base portion 102. As will be described in greater detail below, the connector portion 102 may pivot about the hinge 106 to a closed position against the base portion 102, where the retaining clip 126 locks to the lip 118 of the base portion 102 and the prongs 122 of the conductors 120 electrically connect to the wires 12 of the cable 10.

Referring a FIGS. 4A-4D, an exemplary method of attaching the connector 100 to the cable 10 of the universal cable system is shown generally. In a first step illustrated in FIG. 4A, a user inserts an end of the cable 10 into the keyed opening 110 of the base portion 102. Because the cable 10 has a keyed cross-sectional profile, the cable 10 must be oriented to mate with the keyed opening 110 to be inserted into the base 102 of the connector 100. During this step, the user may also remove the safety cap 124, exposing the prongs 122 of the conductors 120 in the connector 100; however, this action may occur at a later step. Once fully seated in the base 102, in a second step, illustrated in FIG. 4B, a user pivots the connection portion 104 about the hinge 106 and away from the base 102, and positions open jaws 128 of a crimping tool about the base 102. In a third step, illustrated in FIG. 4C, the user closes the jaws 128 of the crimping tool, which deforms the crimping ports 114 to engage the jacket 14 of the cable 10, thereby preventing removal of the cable 10 from the base 102. In a fourth step, illustrated in FIG. 4D, the user rotates the connector portion 102 completely about the hinge 106, which causes the prongs 122 to engage the exposed end of the wires 12 of the cable 10, forming an electrical connection between the wires 12 and the conductors 120. The retaining clip 126 catches against the lip 118 on the base portion 104, which retains the base portion 104 and connection portion 102 together in an assembled relation. Once clipped together, the connector portion 102 is not intended to be unclipped from the base portion 106. The connector 100 is now ready for use with a compatible jack.

Referring now to FIGS. 5A and 5B, an alternative, second embodiment of a connecter for a universal cable system is shown generally at 200. The connector 200 includes a base portion 202 hinged to a connector portion 204. The base portion 202 includes a bottom face with a keyed opening 206 having a complementary profile to the cable 10. Opposite the bottom face is an open top face. With the cable 10 inserted in the keyed opening 206, the end of the cable 10 is revealed in the open top face. The base portion 202 may further include crimping ports on a rear surface and front surface to secure the cable 10 within the keyed opening 206 of the base portion 202 with a crimping tool. Alternatively, the crimping ports may be located on side surfaces of the base portion 202. The front surface of the base portion further includes a mating structure 208, such as a hook, to lock the base portion 202 to the connector portion 204. Where the rear surface and top face join, a hinge 210 is formed, such as a living hinge, which connects the connection portion 202 to the base portion 202. The connector portion 204 includes a rear face, connection jack 210, top surface, bottom surface and side surfaces. The bottom surface has a plurality of conductor having prongs projecting downwardly (not shown), which are configured and arranged in a pattern to align with the wires 12 of the cable 10. The conductors extend through the connector portion 204 and are exposed on the connection jack 210 for receiving a compatible plug (best seen in FIG. 6). In this instance, a proprietary, keyed jack includes a keyway 212 having a post 214 for complementary mating with the connector plug. An optional, removable safety cap may be attached to the rear face of the connection portion 202 to protect the prongs of the conductors, as described above. Extending downward from the bottom surface of the connector portion 202 is a reciprocal mating formation 216, such as a hook, configured and arranged to couple to the mating formation 208 on the base portion 204. The connector portion 202 may be pivoted about the hinge 210 to a closed position against the base portion 204, where the mating formation 208 on the base portion 202 locks to the reciprocal mating formation 216 on the connector portion 204. The prongs of the conductors electrically connect to the wires 12 of the cable 10. The bottom surface and top surface may further include resilient engagement tabs 218 for locking the connector 200 to a patch panel (FIGS. 7A-7B) or wall plate (FIGS. 8A-8D), described further below.

Referring to FIG. 6, an embodiment of a male connector 220 having a connector plug 222 configured to insert into the connection jack 210 of the female connector 200 illustrated in FIGS. 5A and 5B is shown generally. The connector 220 includes a base portion 224 and a connection portion 226. Like the other embodiments, the base portion 224 includes a keyed opening configured to receive the keyed profile of the cable 10. The base portion 224 includes crimping ports to secure the cable 10 to the base portion 224. The connector plug 222 on the connection portion 226 includes a complementary profile having a key 228 with an aperture 230 configured to engage the keyway 212 and post 214 on the female connector plug 210. Conductors 232 in the connector plug 222 are electrically connected to the wires 12 in the cable 10.

Figure 7A:
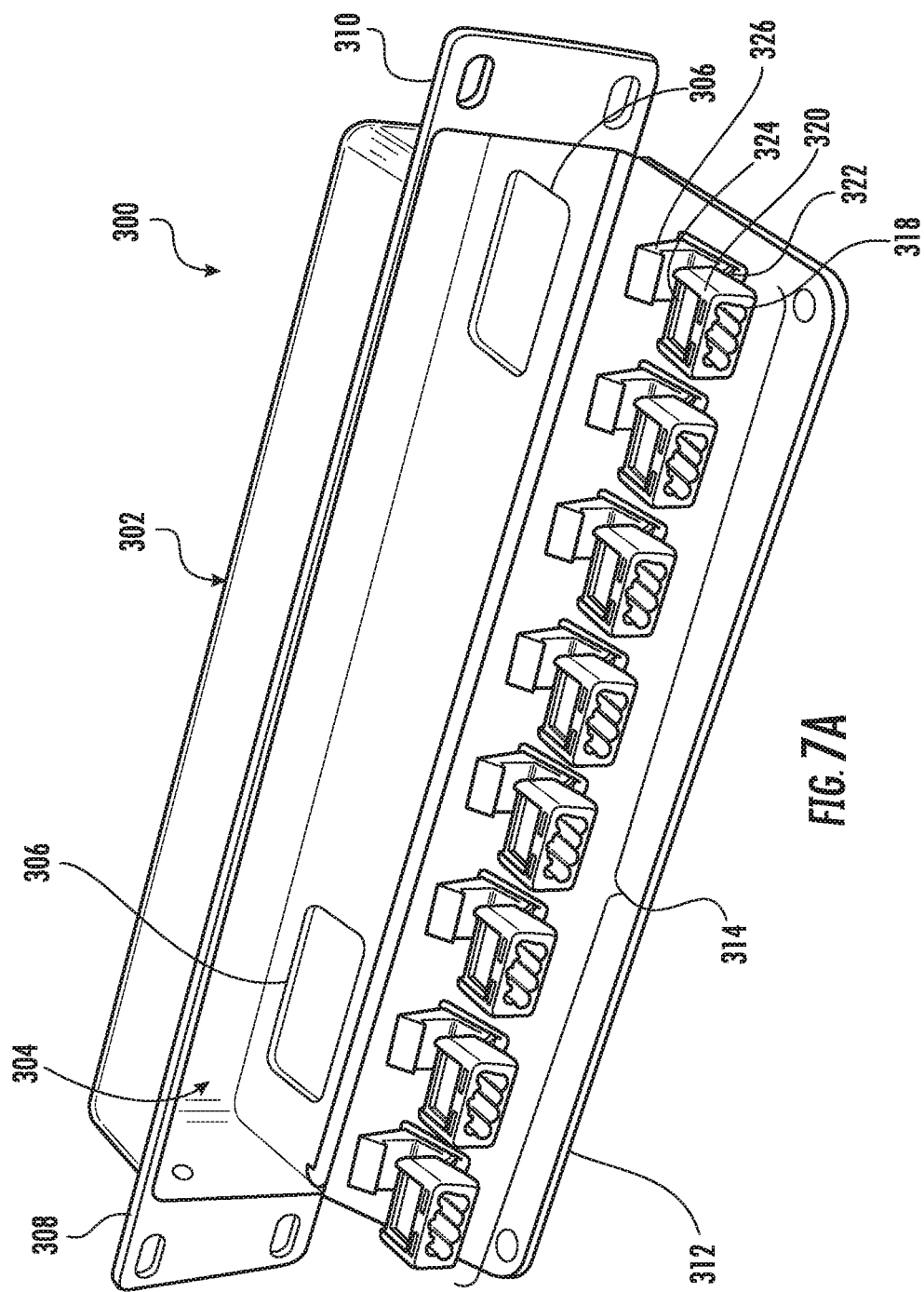
FIG. 7A is a front perspective view of an embodiment of a patch panel with a folding front face in an open position that is configured and arranged to receive a plurality of connectors illustrated in FIGS. 5A-5B.
Figure 7B:
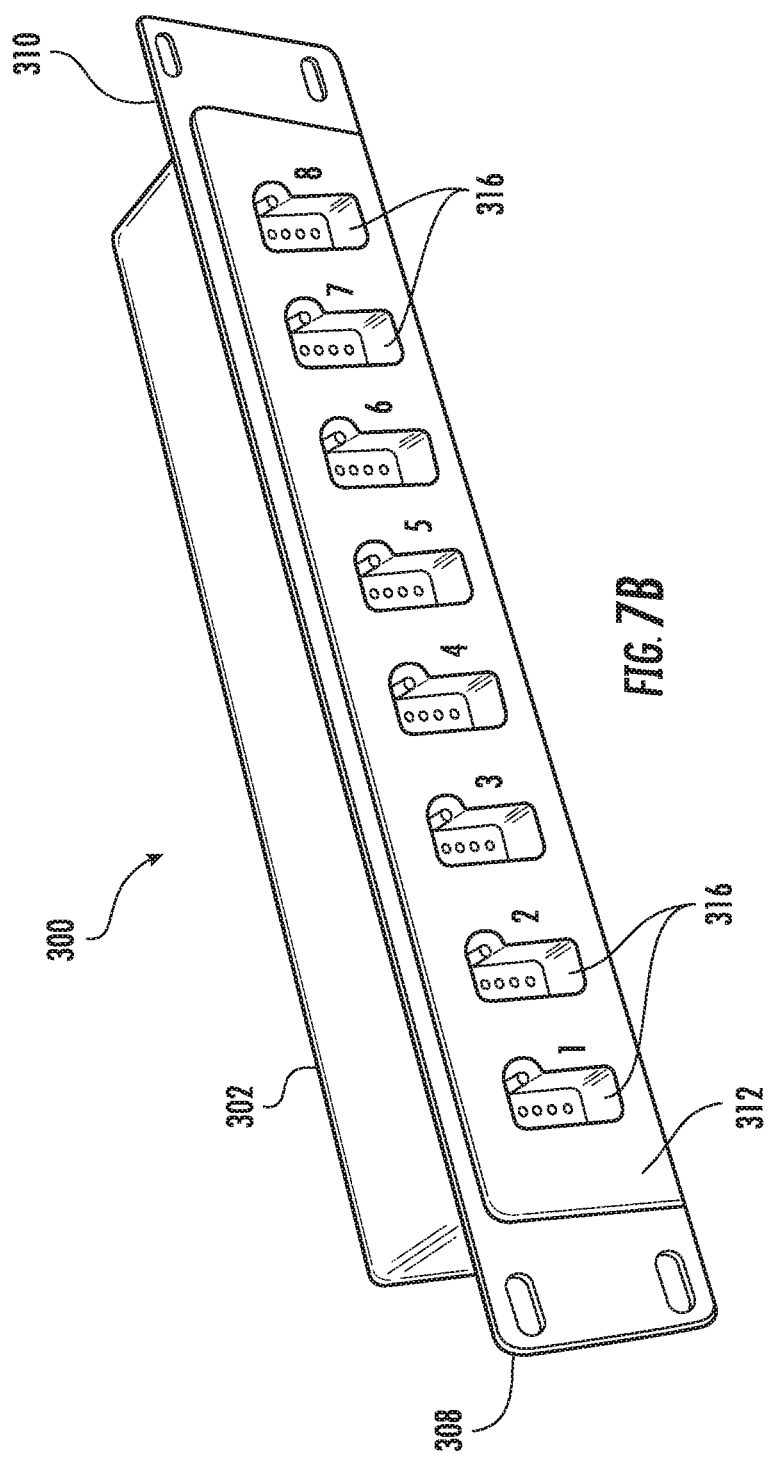
FIG. 7B is a front perspective view of the embodiment of the patch panel with a folding front face in a closed position.

Referring to FIGS. 7A and 7B, an exemplary patch panel of the universal cable system is shown generally at 300. The patch panel 300 includes a body 302 which may have left, right, top, bottom, rear, and front 312 sides defining a cavity 304 therein. One or more of the sides may include cable ports 306 or be omitted entirely, for routing cable into the cavity 304 of the panel 300. Extending from the left and right sides of the body 302 and near the front side may be a left bracket 308 and a right bracket 310 for fastening the patch panel 300 to a rack or other structure, typically located in a central or satellite wiring closet. The front side 312 of the patch panel 300 may be hinged to open and close, providing access to the connectors and cables contained in the cavity of the patch panel. The front side 312 of the patch panel 300 may include a number of connectors 314 having connection jacks 316 exposed thereon or protruding therethrough, configured to receive connector plugs of the connector 200 illustrated in FIG. 6. The connectors 300 may be integrally molded with the front side 312 of the patch panel 300 or seated in an aperture formed on the front side 312, with reciprocal engagement tabs to engage the engagement tabs 218 on the connector 200. The connectors 314 include a base portion 318 hinged to a rear side of the connection jack 316 via a living hinge 322. Like the other embodiments described above, the base portion 318 includes a keyed opening 320 shaped and dimensioned to receive the keyed profile of the cable 10. Opposite the hinge 322, the base portion 318 includes a recess defining a lip 324 thereon, which is configured to engage a retaining clip 326 protruding rearwardly from the connection jack 316. The connection jack 316 includes a number of conductors having rearward projecting prongs, configured to engage the wires 12 of the cable 10 when the base portion 318 is pivoted to the locked position against the connection jack 316.

Referring to FIGS. 8A-8D, an exemplary self-ratcheting wall plate for a universal cable system is shown generally at 400. The wall plate 400 includes a circular body 402 with a front face 404 and rear face 406. The rear face 406 of the wall plate 400 includes a number of rearwardly projecting fingers 408 arranged in a circular pattern. Each finger 408 includes one or more ribs 410 and a beveled leading edge 412. The fingers 408 are configured to be pressed into a wall opening cut into drywall or blue board of an interior wall for easy mounting of the wall plate 400 in a desired location. The front face 404 includes a recessed interior region 414 holding one or more connector jacks 416. In this embodiment, the connector jacks 416 are configured the same as the embodiment of the patch panel 300 illustrated in FIGS. 7A and 7B. The wall plate 400 may further include a removable cover 418, which may include a biased latch 420 to engage with a recess 422 formed on the rim. The cover 418 may include one or more reliefs 424 formed on the edge of the cover 418, allowing exit of cables from the wall plate 400 with the cover 418 closed (best seen in FIG. 4D).

Referring to FIGS. 9A and 9B, an alternative, third embodiment of a connecter for a universal cable system is shown generally at 500. The connector 500 includes a base portion 502 and a connector portion 504 that snap-received onto the connector portion 504. The base portion 502 includes a bottom face with a keyed opening having a complementary profile to the cable 10. Opposite the bottom face is a plug end 506 having a mating formation 508 thereon comprising a recess forming a raised lip. The plug end 506 includes a number of conductors extending through the plug end 506 and having prongs extending into the keyed opening (not shown). With the cable 10 inserted in the keyed opening, the end of the cable 10 engages the prongs at the plug end. The base portion 502 may further include crimping ports 510 on a top surface and bottom surface to secure the cable 10 within the keyed opening of the base portion 502 with a crimping tool. Alternatively, the crimping ports 510 may be located on side surfaces of the base portion 502. The connection portion 504 includes a rear face, connection jack 512, top surface, bottom surface and side surfaces. The bottom surface has a plug receptacle 514 with a reciprocal mating formation 516, such a flexible tongue, configured to engage the mating formation 508 on the plug end 506. The mating formation 516 on the plug receptacle 514 engages the lip 508 on the plug end 506 of the base portion 502, preventing subsequent removal of the base portion 502 from the connection portion 504. The connection portion 504 includes conductors that extend through the connection portion 504 and are exposed on the connection jack 512 for receiving a compatible plug (best seen in FIG. 10). In this instance, a proprietary, keyed jack includes a keyway 518 having a guide structure 520 projecting inwardly for complementary mating with the connector plug. The prongs of the conductors electrically connect to the wires 12 of the cable 10, which electrically connect to the conductors in the connector portion 504 and, ultimately, electrically connect to a connector plug inserted in the connector jack 512. The bottom surface and top surface may further include resilient engagement tabs 522 for locking the connector 500 to a patch panel (FIGS. 11A-11B) or wall plate (FIG. 12), described further below.

Referring to FIG. 10, an embodiment of a male connector having a connector plug configured to insert into the connection jack of the female connector illustrated in FIGS. 9A and 9B is shown generally at 600. The connector 600 includes a base portion 602 and a connection portion 604. Like the other embodiments, the base portion 602 includes a keyed opening, configured to receive the keyed profile of the cable 10, and a plug end. The base portion 602 includes crimping ports to secure the cable 10 to the base portion 602. Plug end of the base portion 602 is inserted into a plug receptacle on the rear face of the connector plug 604. A resilient tongue 606 latches against a lip on the plug end of the base portion 602. A connector plug 608 on the connection portion 604 includes a complementary profile to the keyway of the connection jack, having a groove 610 configured to engage the keyway 518 and guide structure 520 on the female connector plug 512. Conductors 612 in the connector plug 608 are electrically connected to the wires 12 in the cable 10.

Figure 11A:
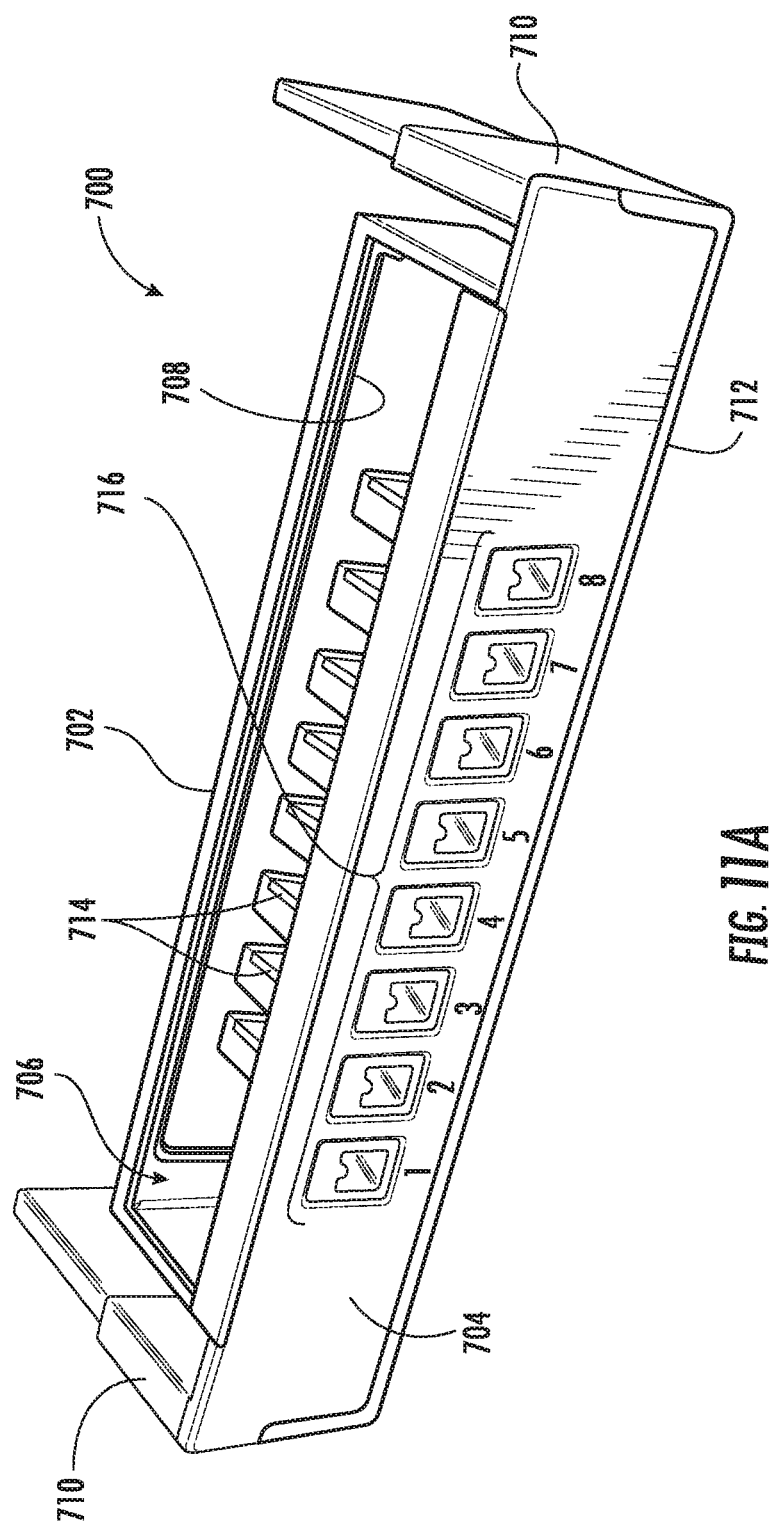
FIG. 11A is a front perspective view of another exemplary embodiment of a panel for use with the connectors illustrated in FIGS. 9A-9B and 10.
Figure 11B:
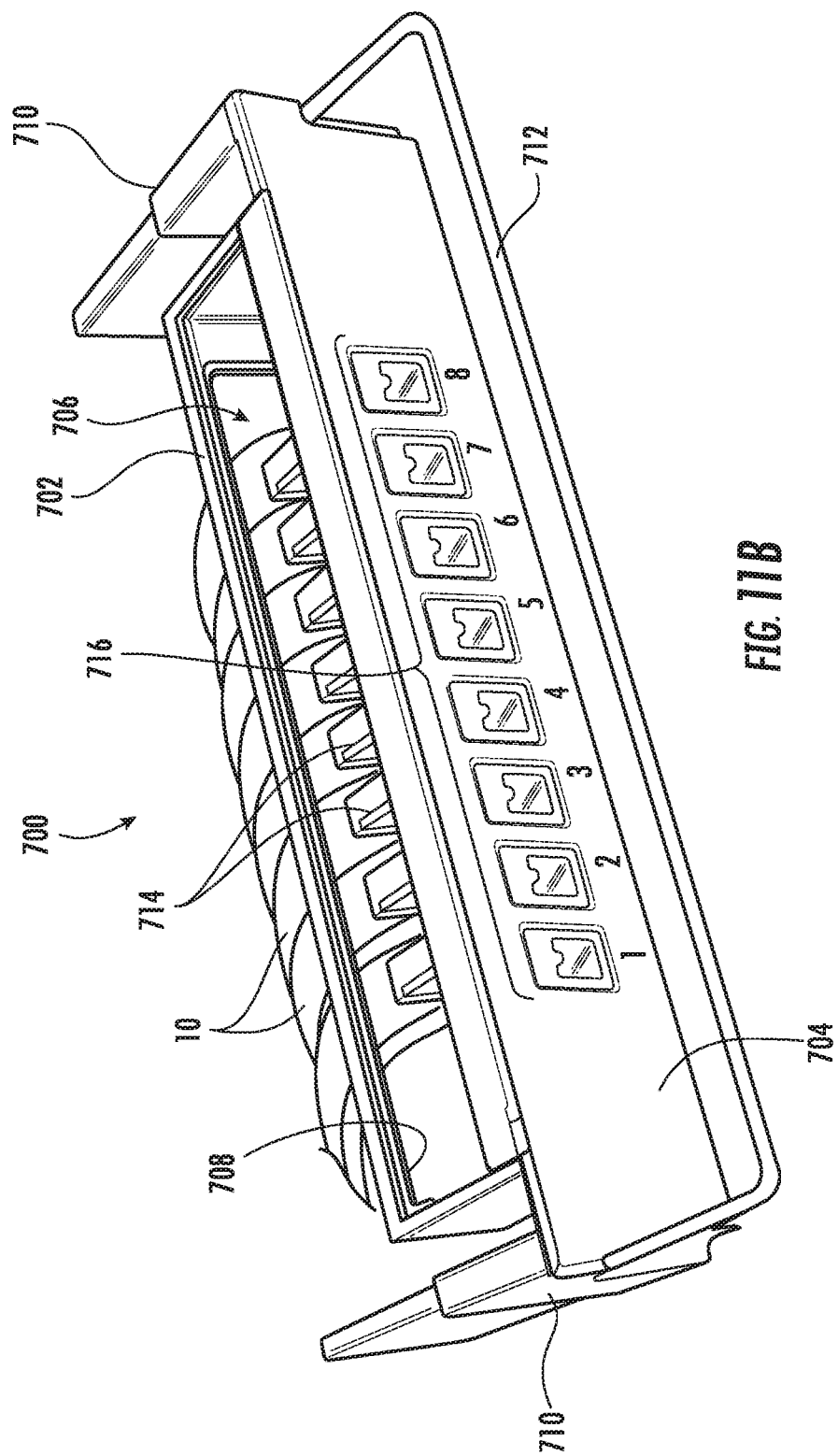
FIG. 11B is a front perspective view of another exemplary embodiment of a panel for use with the connectors illustrated in FIGS. 9A-9B and 10, illustrating operation of a bale for removal of the panel and organization of cables.

Referring to FIGS. 11A and 11B, another exemplary patch panel of the universal cable system is shown generally at 700. The patch panel 700 includes a body 702 which may have left, right, top, bottom, rear, and front 704 sides defining a cavity 706 therein. One or more of the sides may include cable ports 708 or be omitted entirely, for routing cable 10 into the cavity of the patch panel 700. Extending rearwardly from the front 704, and adjacent to the left and right sides of the body 702, are left and right sliding rail assemblies 710 for securing the patch panel 700 in a rack or other structure. The sliding rail assemblies 710 allow the body 702 to slide forward, allowing access to the connectors 714 and cables 10 contained in the cavity 706 of the patch panel 700. A bail handle 712 is provided on the front side 704 of the patch panel 700, allowing the patch panel 700 to be easily pulled on the sliding rail assemblies 710. The front side 704 of the patch panel 700 includes a number of connectors 714 having connection jacks 716 exposed thereon or protruding therethrough, configured to receive connector plugs of the connector illustrated in FIG. 10. The connectors 714 may be integrally molded with the front side 704 of the patch panel 700 or seated in an aperture formed on the front side 704, with reciprocal engagement tabs to engage the engagement tabs 522 on the female connectors 500. Like the embodiment 500, the connectors 700 include a base portion with a plug end configured to be snap-fit into a plug receptacle on a rear side of the connection jack, as described above and shown in FIGS. 9A and 9B.

Figure 12:
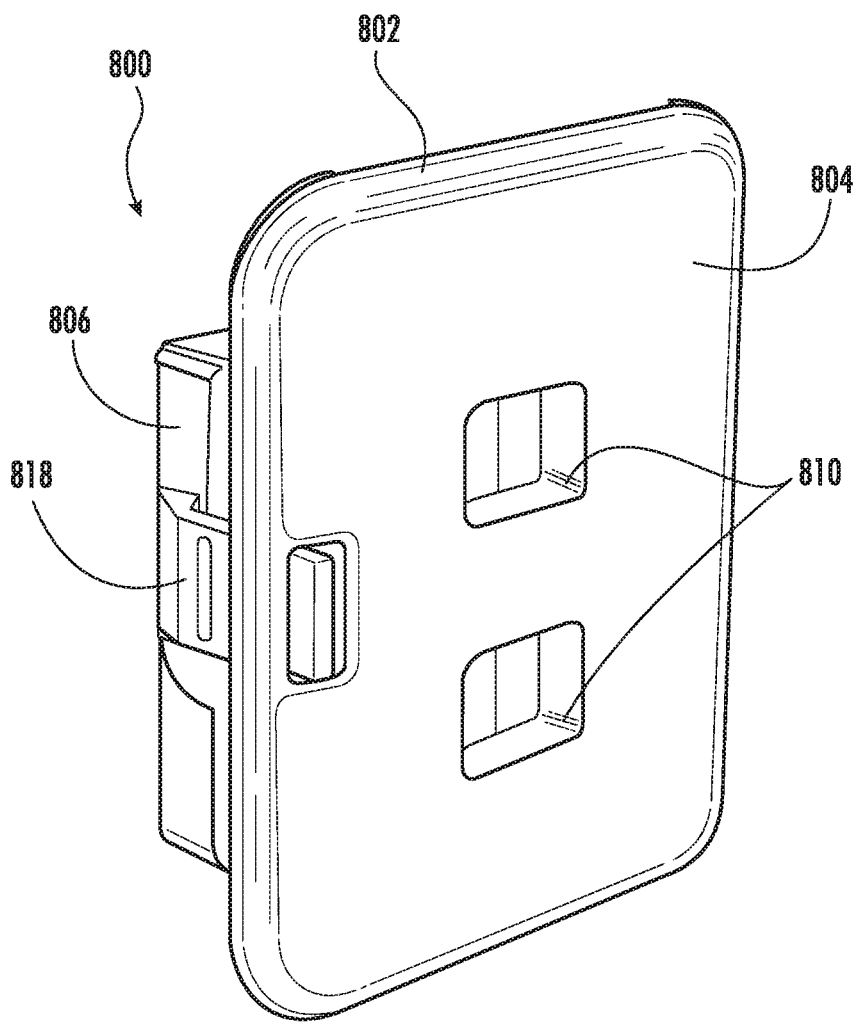
FIG. 12 is a front perspective view of an exemplary embodiment of a two-gang wall plate for use with the connectors illustrated in FIGS. 9A-9B and 10.

Referring to FIG. 12, another exemplary wall plate for a universal cable system is shown generally at 800. The wall plate 800 includes a rectangular body 802 with a front face 804 and rear face opposite the front face 804. The rear face of the wall plate includes a rearwardly projecting sidewalls 806 in a rectangular pattern. The sidewalls 806 are configured to be inserted into a wall opening of an interior wall for easy mounting of the wall plate 800 in a desired location. One or more flex clips 808 extends from one or more of the sidewalls 806, which retains the wall plate 800 to the wall opening through frictional engagement with the wall opening. Flexing the flex clip 808 inwardly allows the wall plate 800 to be removed from the wall opening. The front face 804 includes apertures 810 for one or more connector jacks. Reciprocal engagement tabs engage the engagement tabs 522 on the connector 500 to retain the connector 500 to the wall plate 800.

Referring now to FIGS. 13A and 13B, an exemplary fourth embodiment of a universal cable system is shown generally at 900, having a ribbon-style cable 902 with a number of wires 904, and a self-crimping connector 906. The connector 906 includes a base portion 908 and a connector portion 910 extending therefrom. The base portion 908 includes a hinged section 912, which can pivot from an open position (FIG. 13B) to a closed position (FIG. 13A). In the closed position, a catch 914 on the base portion 908 locks the hinged section 912 to the base portion 908, preventing reopening of the hinged section 912. The hinged section 912 further includes a first mating surface 916 configured to engage a top surface of the cable 902, which may include a number cable sheath or jacket grips 918 to prevent removal of the cable 902. The base portion 908 includes a second mating surface 920 configured to engage a bottom surface of the cable 902. The connection portion 910 includes a plug end 922 configured to be inserted into a compatible jack, such as an RJ45 jack. A number of conductors 924 extend from the plug end 922 and into the base portion 908. Each of the conductors 924 includes and connecting blade 926 projecting through the second mating surface 920 of the base portion 908 and is generally aligned to pierce the jacket 928 on the cable 902 and form an electrical connection with one of the wires 904 of the cable 902.

Referring to FIGS. 14A-14C, an exemplary method of attaching the connector 906 to the cable 902 of the universal cable system is shown generally. In a first step illustrated in FIG. 14A, a user moves the hinged section 912 to the open position and aligns the cable 902 over the second mating surface 920. In a second step illustrated in FIG. 14B, a user closew the hinged section 912 against the base portion 908, ensuring the latch 914 engages the hinged section 912. In a third step illustrated in FIG. 14C, the connector 906 is shown self-crimped onto the end of the cable 902.

Referring to FIGS. 15A-15C, a fifth exemplary embodiment of a universal cable system is shown generally at 1000, having a ribbon-style cable 902 with a number of wires 904 encased in a jacket 928, and a self-crimping connector 1002 with integrated cable blade 1004 from trimming the off an uneven end 1016 of the cable 902. The connector 1002 includes a base portion 1006 and a connector portion 1008 extending therefrom. The base portion 1006 includes a hinged section 1010, which can pivot from an open position (FIG. 15A) to a closed position (FIG. 15C). In the closed position, a catch 1012 on the base portion 1006 locks the hinged section 1010 to the base portion 1006, preventing reopening of the hinged section 1010. The hinged section 1010 further includes a first mating surface 1014 configured to engage a top surface of the cable 902, which may include a number cable sheath or jacket grips to prevent removal of the cable 902. A cable blade 1004 is attached to the hinged section 1010. The base portion 1006 includes a second mating surface 1018 configured to engage a bottom surface of the cable 902. A pair of opposing cable retainers 1020 extends from the base portion 1006, which are used to align the cable 902 for trimming and crimping. The connection portion 1008 includes a plug end 1022 configured to be inserted into a compatible jack, such as an RJ45 jack. A number of conductors extend from the plug end and into the base. Each of the conductors 1024 includes and connecting blade projecting through the second mating surface 1018 of the base 1006 and is generally aligned to pierce the jacket 928 on the cable 902 and form an electrical connection with one of the wires 904 of the cable 902, as illustrated in the embodiment shown in FIGS. 14A-14C. In use, the user aligns the cable 902 in the cable retainers 1020 over the base portion 1006. The user then pivots the hinged section 1010 about the base portion 1006, bringing the cable blade 1004 into contact with the cable 902. Pressing the hinged section 1010 firmly, the cable blade 1004 cuts the cable 902 allowing the hinged section 1010 to fully close and lock with the latch 1012 on the base portion 1006. As the newly cut cable 902 is captured between the first and second surfaces 1014, 1018 of the hinged section 1010 and base portion 1006, respectively, the cable 902 is spliced with the blades of the conductors 1024, similar to the embodiment illustrated in FIGS. 13A, 13B and 14A-14C.

Figures 16A, 16B:
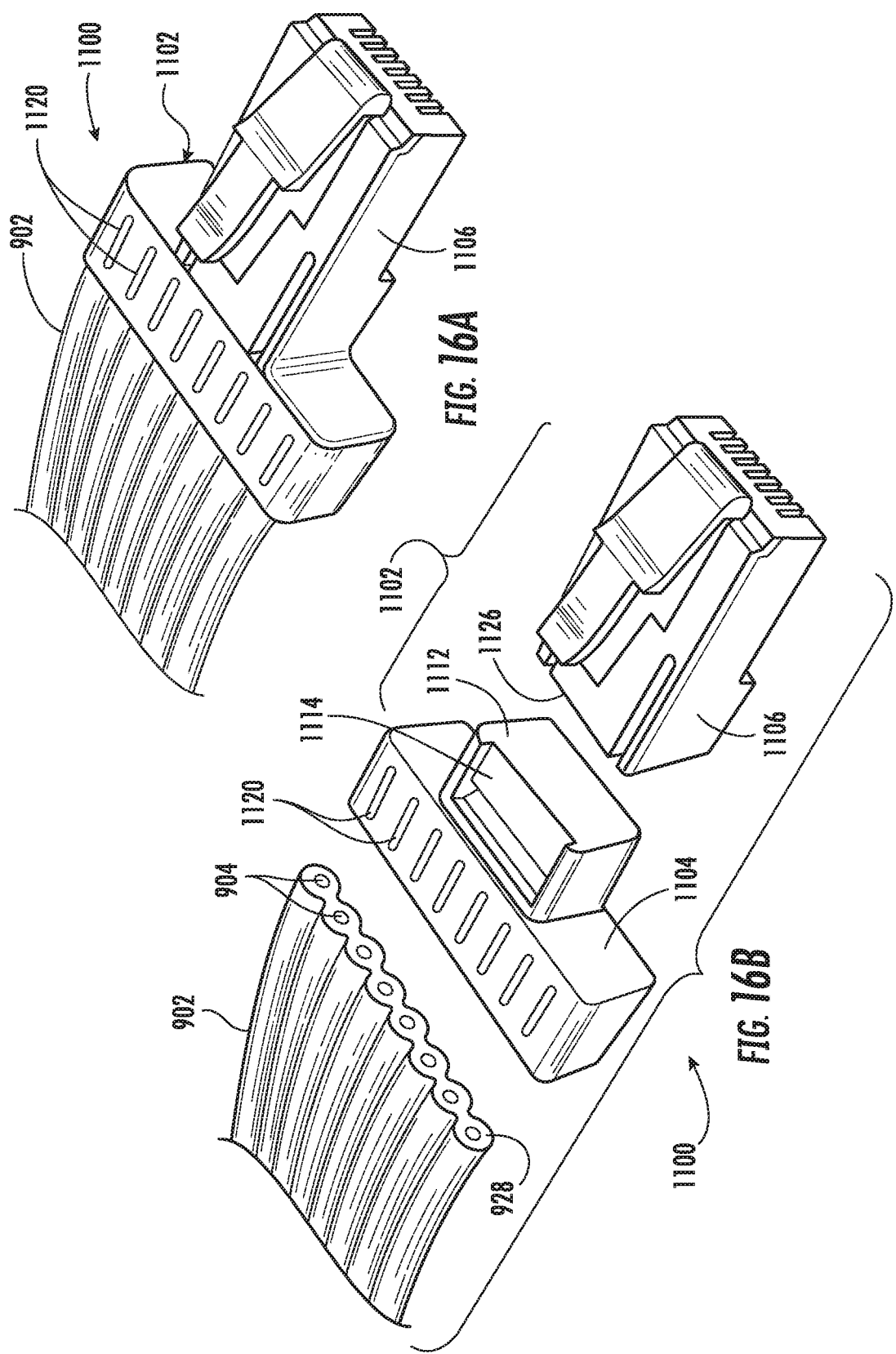
FIG. 16A is a front perspective view of another alternative embodiment of a universal cable system.
FIG. 16B is a partial exploded front view of another alternative embodiment of a universal cable system.
Figure 16C:
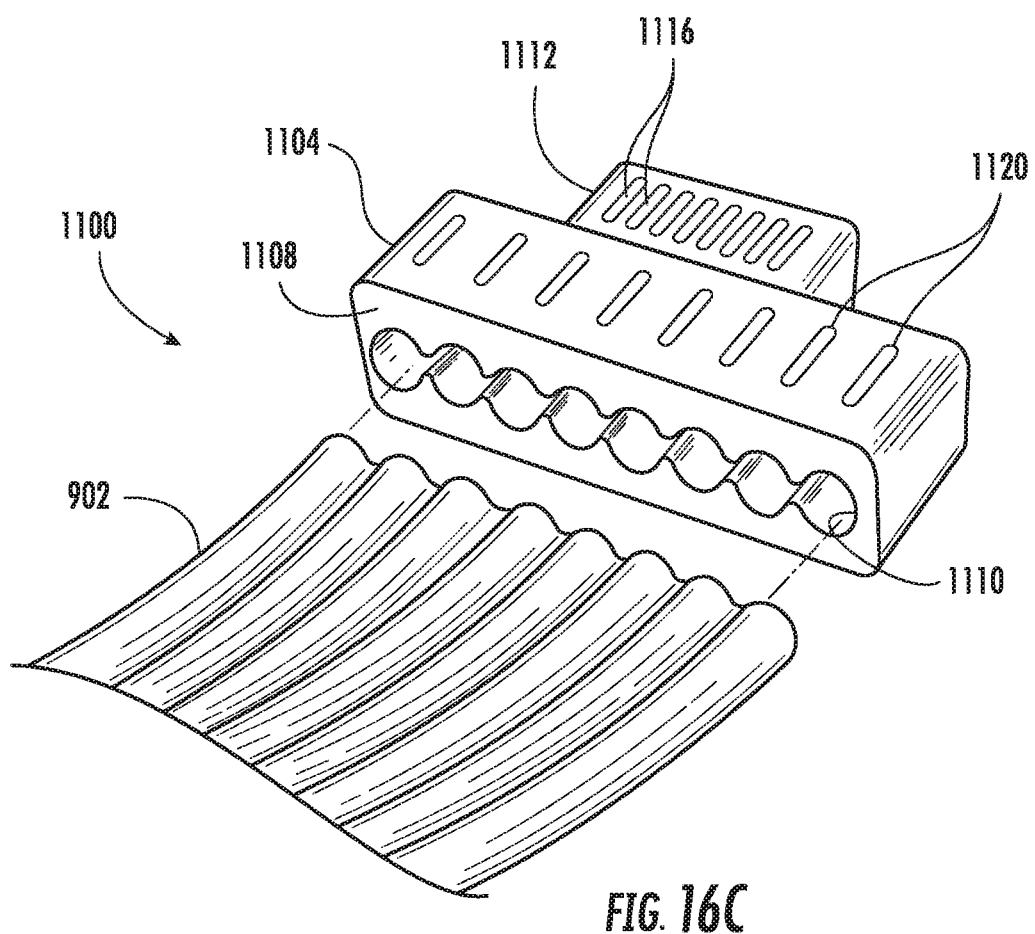
FIG. 16C is a partial exploded rear view of another alternative embodiment of a universal cable system.
Figure 27A:
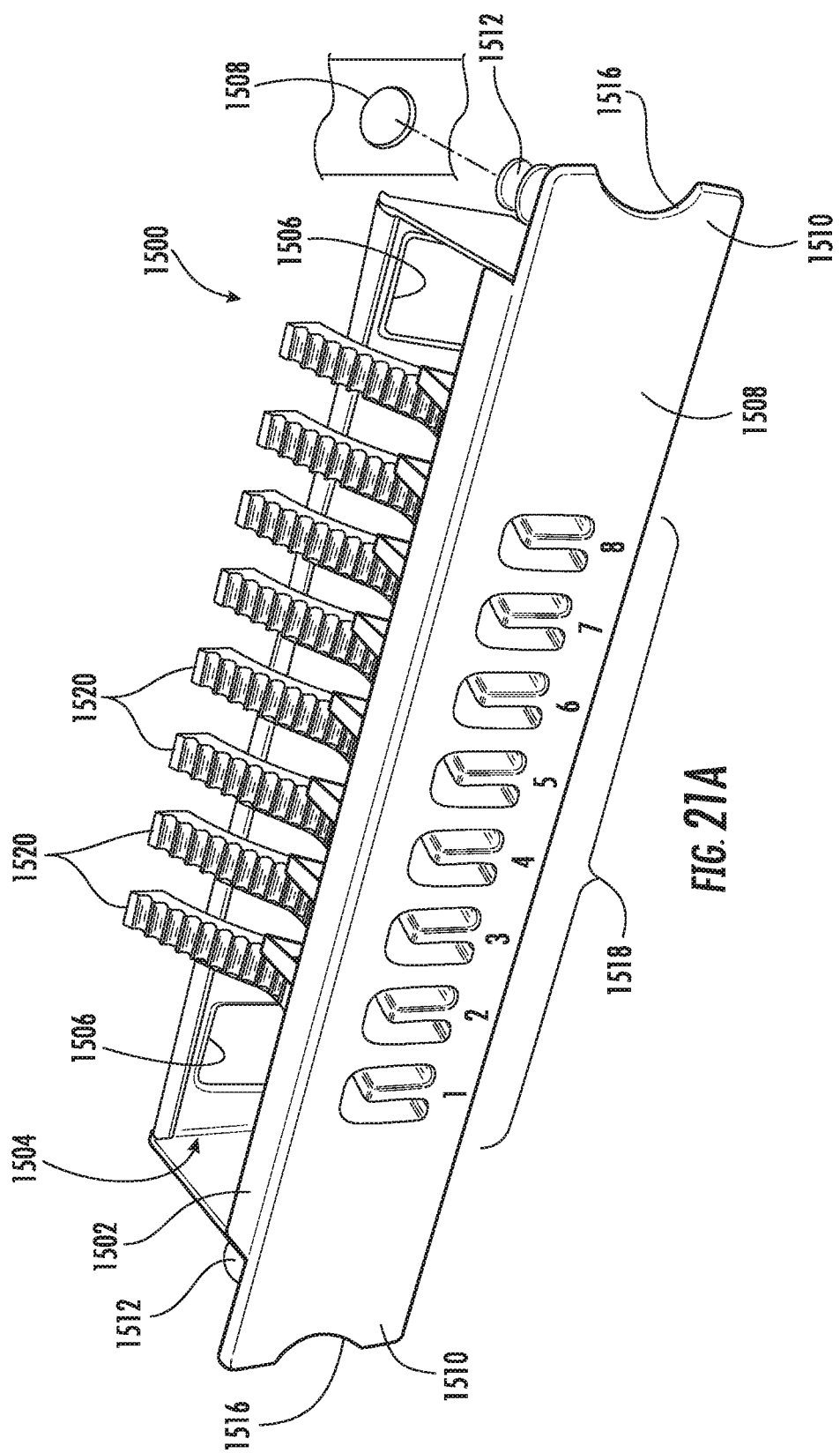

Referring to FIGS. 16A-16C, a sixth exemplary embodiment of a connector 1102 of the universal cable system is shown generally at 1100. The connector 1102 includes a base portion 1104 and a connector portion 1106 that snap-received onto the connector portion 1106. The base portion 1104 includes a rear face 1108 with a keyed opening 1110 having a complementary profile to the cable 902 (best seen in FIG. 16C). Opposite the rear face 1108 is a plug end 1112 having a mating formation 1114 thereon having a recessed portion thereon. The plug end 1112 includes a number of conductors 1116 extending through the plug end 1112 and having blades 1118 for piercing the jacket 928 of the cable 902, described further below. The base portion 1104 may further include crimping ports 1120 on a top surface and/or bottom surface to secure the cable 902 within the keyed opening 1110 of the base portion 1104 with a crimping tool. Alternatively, or in addition to, the crimping ports 1120 may be located on side surfaces of the base portion 1104. The connection portion 1106 includes a rear face, connection plug, top surface, bottom surface and side surfaces. The rear face has a plug receptacle 1124 with a reciprocal mating formation 1126 configured to engage the mating formation 1114 on the plug end 1112. The reciprocal mating formation 1126 on the plug receptacle 1124 engages the mating formation 1114 on the plug end 1112 of the base portion 1104, preventing subsequent removal of the base portion 1104 from the connection portion 1106. The connection portion 1106 includes conductors 1128 that extend through the connection portion 1106 and form an electrical connection with the conductors 1116 in the base portion 1104, described further below. A number of blade elements 1130 are included on the bottom surface of the connection portion 1106 for driving the conductors 1128 into electrical contact with the conductors 1116 in the plug end 1112 of the base portion 1104. The conductors 1128 further extend to the connection plug for insertion into a compatible jack. In this instance, an RJ45 style connection plug is shown, however, other connection plugs may be used.

Referring to FIGS. 17A-17G, an exemplary method of attaching the connector 1102 to the cable 902 of the universal cable system 1100 is shown generally. In a first step illustrated in FIG. 17A, a user inserts an end of the cable 902 into the keyed opening 1110 of the base portion 1104. Because the cable 902 has a keyed cross-sectional profile, the cable 902 must be oriented correctly to mate with the keyed opening 1110 to be inserted into the base portion 1104 of the connector 1102. Once fully seated in the base portion 1104, in a second step, illustrated in FIG. 17B, a user positions open jaws 1132 of a crimping tool about the base portion 1104. In a third step, illustrated in FIG. 17C, the user closes the jaws 1132 of the crimping tool, which deforms the crimping ports 1120 to engage the jacket 928 of the cable 902, thereby preventing removal of the cable 902 from the base portion 1104, and simultaneously drives the blades 1118 of the conductors 1116 in the base portion 1104 into the jacket 928 of cable 902, forming an electrical connection with the wires 904 in the cable 902. In a fourth step, illustrated in FIG. 17D, the user inserts the plug end 1112 of the base portion 1104 into the plug receptacle 1124 of the connection portion 1106, causing the mating formation 1114 and reciprocal mating formation 1126 to interlock. In a fifth step, illustrated in FIG. 17E, the user aligns the open jaws 1132 of a crimping tool over the plug receptacle 1124 of the connection portion 1106. In the seventh step, illustrated in FIG. 17F, the user closes the jaws 1132 of the crimping tool, driving blade elements 1130 into the plug receptacle 1124, thereby driving the conductors 1128 of the connector portion 1106 into contact with the conductors 1116 in the plug end 1112 of the base portion 1104. In a seventh step, illustrated in FIG. 17G, the connector 1102 is now ready for use with a compatible jack.

Referring to FIG. 18, a seventh exemplary embodiment of connector of the universal cable system is shown generally at 1200. The connector 1200 in this embodiment includes all the features of the connector 1102 illustrated in FIGS. 16A-16C, however, the base portion 1202 and connection portion 1204 are unitarily formed. Thus, the connector 1200 in this exemplary embodiment is less expensive at the sacrifice of versatility of having a selectable connection portion.

Referring to FIGS. 19A and 19B, an eighth exemplary embodiment of a connector for a universal connector system is shown generally at 1300. The connector 1302 includes a body 1304 having a top, bottom, left, right, front, and rear sides. A jack 1306 is located on the front side of the body 1304 for receiving a compatible plug (see, e.g., FIG. 20). The jack 1306 may have a keyed opening, such as a horseshoe shape, preventing a plug from being inserted into the jack 1306 in an incorrect orientation. The body 1304 includes a hinged section 1308, which can pivot from an open position (FIG. 19A) to a closed position (FIG. 19B). In the closed position, a catch 1310 on the body 1304 locks the hinged section 1308 to the body 1304, preventing reopening of the hinged section 1308. The hinged section 1310 further includes a first mating surface 1312 configured to engage a top surface of the cable 902, which may include a number cable sheath or jacket grips to prevent removal of the cable 902. The body 1304 further includes a second mating surface 1314 configured to engage a bottom surface of the cable 902. A number of conductors extend from the plug and into the body 1304. Each of the conductors includes a blade 1316 projecting through the second mating surface 1314 of the body 1304 and is generally aligned to pierce the jacket 928 on the cable 902 and form an electrical connection with one of the wires 904 of the cable 902. The bottom and top sides may further include resilient engagement tabs 1318 for locking the connector 1302 to a patch panel (FIGS. 21A-21B) or wall plate (FIGS. 22A-22D), described further below.

Referring to FIG. 20, an embodiment of a male connector having a connector plug configured to insert into the connection jack 1306 of the female connector 1302 illustrated in FIGS. 19A and 19B is shown generally at 1400. The connector 1400 includes a base portion 1402 and a connection portion 1404. Base portion 1042 may also include a release button 1403, which retracts a hook into slot 1405 on the connector portion 1404, allowing the connector 1400 to be freed from a connector jack 1306. Like the other embodiments, the base portion 1402 includes a keyed opening configured to receive the keyed profile of the cable 902. The base portion 1402 includes crimping ports to secure the cable 902 to the base portion 1402. A connector plug 1406 on the connection portion 1404 includes a complementary profile having a key with an aperture configured to engage the horseshoe shaped keyway on the female connector plug 1306. Conductors 1408 in the connector plug 1406 are electrically connected to the wires 904 in the cable 902.

Figure 21B:
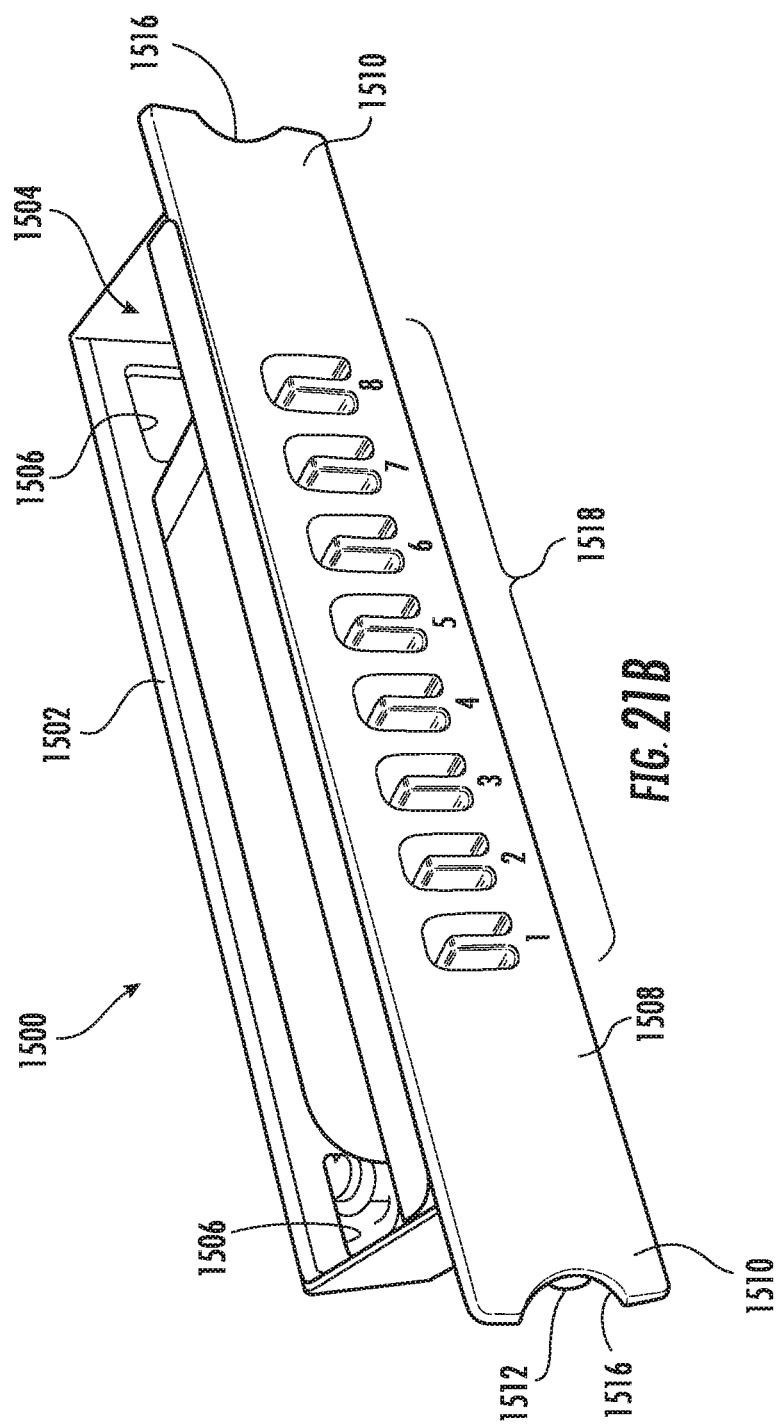
FIG. 21B is a top, left, front perspective view of an embodiment of a panel having a plurality of connectors illustrated in FIGS. 19A-19B, showing organization of the cables therein.

Referring to FIGS. 21A and 21B, another exemplary embodiment of a patch panel of the universal cable system is shown generally at 1500. The patch panel 1500 includes a body 1502 which may have left, right, top, bottom, rear, and front sides defining a cavity 1504 therein. One or more of the sides may include cable ports 1506 or be omitted entirely, for routing cable into the cavity 1504 of the panel. Extending from the left and right sides of the body 1502 and near the front side 1508 may be a left and right brackets 1510 for fastening the patch panel 1500 to a rack or other support structure, via push grommets 1512 on the brackets 1510 inserted into holes 1514 on the rack or frame of the support structure. The brackets 1510 may further include finger holds 1516 for pulling the panel 1500 free of the support structure as sufficient force applied will cause the push grommets 1512 to separate from the holes 1514 on the rack or other support structure. Once removed from the rack or other support structure, a user may access the connectors 1518 and cables contained in the cavity of the patch panel. The front side 1508 of the patch panel 1500 includes a number of connectors having connection jacks exposed thereon or protruding therethrough, configured to receive connector plugs of the connector illustrated in FIGS. 19A and 19B. The connectors may be integrally molded with the front side of the patch panel or seated in an aperture formed on the front side, with reciprocal engagement tabs to engage the engagement tabs. For integrally molded connectors, the connectors 1518, may include self-crimping mechanism that includes a hinged section 1520, as described for the connector illustrated in FIGS. 19A and 19B, that folds forward, capturing the cable therein.

Referring to FIGS. 22A-22D, another exemplary wall plate for a universal cable system is shown generally at 1600. The wall plate 1600 includes a body 1602 with a front face, rear face, and curvilinear ends. The rear face of the wall plate includes a rearwardly projecting sidewall 1604 having one or more flex clips 1606 configured to frictionally engage a wall opening. The sidewall 1604 is configured to be inserted into a wall opening of an interior wall for easy mounting of the wall plate 1600 in a desired location. The flex clips 1606 hold the wall plate in place. Inward deflection of the flex clip 1606 permits the wall plate 1600 to be removed from the wall opening. The front face includes a recessed interior region 1608 holding one or more connector jacks 1610. In this embodiment, the connector jacks 1610 are configured the same as the embodiment of the patch panel illustrated in FIGS. 19A and 19B. The wall plate 1600 may further include a hinged cover 1612, permitting access to the connectors 1610 when open and providing dust protection and an enhanced aesthetic appearance when closed. The cover 1612 may include one or more reliefs 1614 formed on the edge of the cover 1612, allowing cables 1616 to exit the wall plate 1600 with the cover 1612 closed.

Therefore, it can be seen that the exemplary embodiments of universal cable system described herein solves the problems of the prior art by providing a cable and connector that does not require complex training and tools to wire correctly. Furthermore, the universal cable system provides a simple, cost-effective system to provide both high-voltage and low-voltage wiring for internet, telephony, POE systems, and LED lighting and control systems for new and old construction.

Those skilled in the art will appreciate that the conception, upon which this disclosure is based, may readily be utilized as a basis for designing other products without departing from the spirit and scope of the invention as defined by the appended claims. Therefore, the claims are not to be limited to the specific examples depicted herein. For example, the features of one example disclosed above can be used with the features of another example. Furthermore, various modifications and rearrangements of the parts may be made without departing from the spirit and scope of the underlying inventive concept. For example, the geometric configurations disclosed herein may be altered depending upon the application, as may the material selection for the components. Thus, the details of these components as set forth in the above-described examples, should not limit the scope of the claims.

What is claimed is:

1. A connector for a cable having a jacket and plurality of wires arranged in a keyed cross-sectional profile, the connector comprising:
   a base portion having a keyed opening configured and arranged to receive the keyed cross-sectional profile of the cable therein and a plug end; and
   a connector portion having a plurality of conductors configured and arranged for electrical communication with the plurality of wires of the cable, the connector portion including a plug receptacle at one end thereof configured and arranged to receive the plug end of the base portion.

2. The connector of claims 1, wherein the connector portion is hinged to the base portion.

3. The connector of claim 1, wherein the connector portion further includes a plurality of prongs extending from the plurality of conductors, the plurality of prongs configured and arranged to electrically connect with the plurality of wires when the connector portion is in an assembled relation to the base portion.

4. The connector of claim 1, wherein the base portion further includes a crimping port configured and arranged to engage the jacket of the cable, preventing removal of the cable from the keyed opening of the base portion.

5. The connector of claim 1, wherein the keyed opening has a symmetrical shape.

6. The connector of claim 1, wherein each of the plurality of conductors comprises a blade configured and arranged for piercing the jacket of the cable and forming an electrical connection with a corresponding wire in the cable.

7. The connector of claim 1, wherein the plug and the plug receptacle have reciprocal mating formations wherein when the plug end is inserted into the plug receptacle the mating formation on the plug engages the mating formation in the plug receptacle so as to prevent inadvertent subsequent removal of the base portion from the connector portion.

8. A connector for a cable having a jacket and plurality of wires arranged in a keyed cross-sectional profile, the connector comprising:
  a base portion having a keyed opening configured and arranged to receive the keyed cross-sectional profile of the cable therein and a plug end; and
  a connector portion connectable to the base portion, the connector portion having a plurality of conductors configured and arranged for electrical communication with the plurality of wires of the cable when a cable is inserted into the keyed opening and the connector portion is assembled with the base portion and further including a plug receptacle at one end thereof configured and arranged to receive the plug end of the base portion.

9. The connector of claim 8, wherein the connector portion further includes a retaining clip configured and arranged to engage a surface on the base portion, wherein the retaining clip holds the connector portion and base portion in an assembled relation.

10. The connector of claim 2, wherein the connector portion is hinged to the base portion.

11. The connector of claim 8, wherein the connector portion further includes a plurality of prongs extending from the plurality of conductors, the plurality of prongs configured and arranged to electrically connect with the plurality of wires when the connector portion is in an assembled relation to the base portion.

12. The connector of claim 8, wherein the base portion further includes a crimping port configured and arranged to engage the jacket of the cable, preventing removal of the cable from the keyed opening of the base portion.

13. The connector of claim 8, wherein the keyed opening has a symmetrical shape.

14. The connector of claim 8, wherein each of the plurality of conductors comprises a blade configured and arranged for piercing the jacket of the cable and forming an electrical connection with a corresponding wire in the cable.

15. The connector of claim 8, wherein the plug and the plug receptacle have reciprocal mating formations wherein when the plug end is inserted into the plug receptacle the mating formation on the plug engages the mating formation in the plug receptacle so as to prevent inadvertent subsequent removal of the base portion from the connector portion.

16. A connector for a cable having a jacket and plurality of wires arranged in a keyed cross-sectional profile, the connector comprising:
  a base portion having a keyed opening configured and arranged to receive the keyed cross-sectional profile of the cable therein and a crimping port configured and arranged to engage the jacket of the cable to secure the cable to the base portion; and
  a connector portion pivotable between an open position and a closed position, the connector portion having a plurality of conductors configured and arranged for electrical communication with the plurality of wires of the cable when the cable is inserted into the keyed opening and the connector portion is pivoted to the closed position with the base portion.

17. The connector of claim 16, wherein the connector portion further includes a retaining clip configured and arranged to engage a surface on the base portion, wherein the retaining clip holds the connector portion and base portion in an assembled relation.

18. The connector of claim 16, wherein the connector portion further includes a plurality of prongs extending from the plurality of conductors, the plurality of prongs configured and arranged to electrically connect with the plurality of wires when the connector portion is in an assembled relation to the base portion.

19. The connector of claim 16, wherein the keyed opening has a symmetrical shape.

20. The connector of claim 16, wherein the base portion further includes a plug end and the connector portion includes a plug receptacle configured and arranged to receive the plug end therein.

21. The connector of claim 20, wherein the plug and the plug receptacle have reciprocal mating formations wherein when the plug end is inserted into the plug receptacle the mating formation on the plug engages the mating formation in the plug receptacle so as to prevent inadvertent subsequent removal of the base portion from the connector portion.

* * * * *